(12) United States Patent
Hoang

(10) Patent No.: US 11,925,288 B1
(45) Date of Patent: Mar. 12, 2024

(54) NOZZLE STRUCTURE FOR STEAMING MILK

(71) Applicant: TML Innovative Products, Mukilteo, WA (US)

(72) Inventor: Thanh S. Hoang, Woodinville, WA (US)

(73) Assignee: TML Innovative Products, LLC, Mukilteo, WA (US)

( * ) Notice: Subject to any disclaimer, the term of this patent is extended or adjusted under 35 U.S.C. 154(b) by 353 days.

(21) Appl. No.: 16/576,728

(22) Filed: Sep. 19, 2019

(51) Int. Cl.
*A47J 31/44* (2006.01)
*A47J 31/30* (2006.01)

(52) U.S. Cl.
CPC ........... *A47J 31/4489* (2013.01); *A47J 31/30* (2013.01)

(58) Field of Classification Search
CPC .................................................. A47J 31/4489
See application file for complete search history.

(56) References Cited

U.S. PATENT DOCUMENTS

| | | |
|---|---|---|
| D28,608 S | 5/1898 | Renner |
| D362,999 S | 10/1995 | Müller |
| D395,073 S | 6/1998 | Albertson |
| 5,785,256 A | 7/1998 | Mahlich |
| D396,611 S | 8/1998 | Huang |
| D478,765 S | 8/2003 | Seum et al. |
| D479,801 S | 9/2003 | Carmichael et al. |
| D498,839 S | 11/2004 | Yoshida |
| 6,810,795 B1 | 11/2004 | Hsu |
| D592,003 S | 5/2009 | Giugiaro |
| D687,874 S | 8/2013 | Furujo et al. |
| D749,692 S | 2/2016 | Shawver |
| D766,643 S | 9/2016 | Brensinger |
| 9,560,931 B2 * | 2/2017 | Cingolani ............... A47J 31/44 |
| D846,653 S | 4/2019 | Dyer et al. |
| D852,428 S | 6/2019 | LeMieux |
| D928,914 S | 8/2021 | Dubac |
| 2011/0036243 A1 | 2/2011 | Hiron |
| 2012/0104038 A1 | 5/2012 | Quaratesi |
| 2017/0055764 A1 * | 3/2017 | Weber et al. ........... A47J 31/44 |
| 2017/0304851 A1 | 10/2017 | Paal |

(Continued)

FOREIGN PATENT DOCUMENTS

| | | | |
|---|---|---|---|
| EP | 0727167 A1 * | 8/1996 | ............... A47J 31/44 |
| EP | 1787554 A2 * | 5/2007 | .......... A47J 31/4489 |
| EP | 2351502 A1 * | 8/2011 | ............... A47J 31/46 |

(Continued)

OTHER PUBLICATIONS

Machine translation of WO 2005107541 A1 performed on Apr. 19, 2022, Thuliez (Year: 2005).*

(Continued)

*Primary Examiner* — Dana Ross
*Assistant Examiner* — Kevin Guanhua Wen
(74) *Attorney, Agent, or Firm* — Davis Wright Tremaine LLP

(57) ABSTRACT

A nozzle structure having an intake end and an outtake end, wherein a lateral axis is associated with the center of the intake end. A plurality of nozzle bores are uniformly distributed over the outtake end, and each nozzle bore is orthogonal to the lateral axis. Each nozzle bore includes an outlet in communication with the intake end. A flow path between the inlet and outlet forms an acute angle with the intake end.

19 Claims, 33 Drawing Sheets

(56) References Cited

U.S. PATENT DOCUMENTS

2018/0014687 A1* 1/2018 Ta .................. A47J 31/44
2018/0271316 A1   9/2018 De'Longhi et al.

FOREIGN PATENT DOCUMENTS

| EP | 2446792 A1 * | 5/2012 | .............. A47J 31/44 |
|----|---|---|---|
| EP | 2944237 A1 * | 11/2015 | .............. A47J 31/44 |
| WO | WO 2005107541 A1 * | 11/2005 | .............. A47J 31/46 |
| WO | D081860-001 | 3/2014 | |

OTHER PUBLICATIONS

Machine translation of EP 1787554 A2 performed on Mar. 8, 2023, Balkau et al. (Year: 2007).*
Machine translation of EP 2944237 A1 performed on Mar. 8, 2023, Buttiker et al. (Year: 2015).*
Machine translation of WO 2005107541 A1 performed on Mar. 8, 2023, Thuliez (Year: 2005).*
Ascaso 3-Hole Steam Tip, Blue Star Coffee, [online], [site visited Aug. 19, 2021], Available from internet URL: https://www.bluestarcoffee.eu/ascaso-3-hole-steam-tip-514-p.asp (Year: 2021).
Schaerer 4 Hole Steam Tip Nozzle 3370061344 61344, Voltage Coffee Supply, [online], [site visited Aug. 19, 2021], Available from internet URL: https://www.voltagerestaurantsupply.com/products/schaerer-61344-steam-tip-nozzle-standard-usa-power-steam-coffee-art-plus?variant=2948507 4513943 (Year: 2021).
Steam Tip, "TML Innovative Products [online]", https://tmlip.com/steam-tip, 2022, 3 pages.

* cited by examiner

NOZZLE STRUCTURE FOR STEAMING MILK

CROSS REFERENCE TO RELATED APPLICATIONS

This application incorporates by reference for all purposes the full disclosure of co-pending U.S. Design application Ser. No. 29/706,403, filed Sep. 19, 2019, entitled "STEAM NOZZLE."

BACKGROUND

Espresso drinks are popular throughout the world. Despite their popularity, the consistency of quality is highly variable, especially in regards to milk foam (e.g., foam from animal milk or plant-based liquids suitable for substituting animal milk) that used as an ingredient. Generally speaking, techniques to make the production of milk foam easier to server greater numbers of customers have resulted in a significant amount of lower quality drinks being served. To this day, conventional tools for frothing milk require highly skilled operators to produce quality drinks. In order to consistently produce the desired amount and texture of foam for a particular drink, a substantial amount of practice is required because the operator must carefully manipulate the milk vessel while keeping the steam nozzle at the optimal depth. This involves a lot of attention which prevents the operators from performing other tasks. If this is done improperly, the air and milk do not fully incorporate into each other, which will produce low quality frothed milk with large separated bubbles.

BRIEF DESCRIPTION OF THE DRAWINGS

Various techniques will be described with reference to the drawings, in which.

FIG, 26 is a front view of a nozzle structure in accordance with an embodiment.

Figure 27:
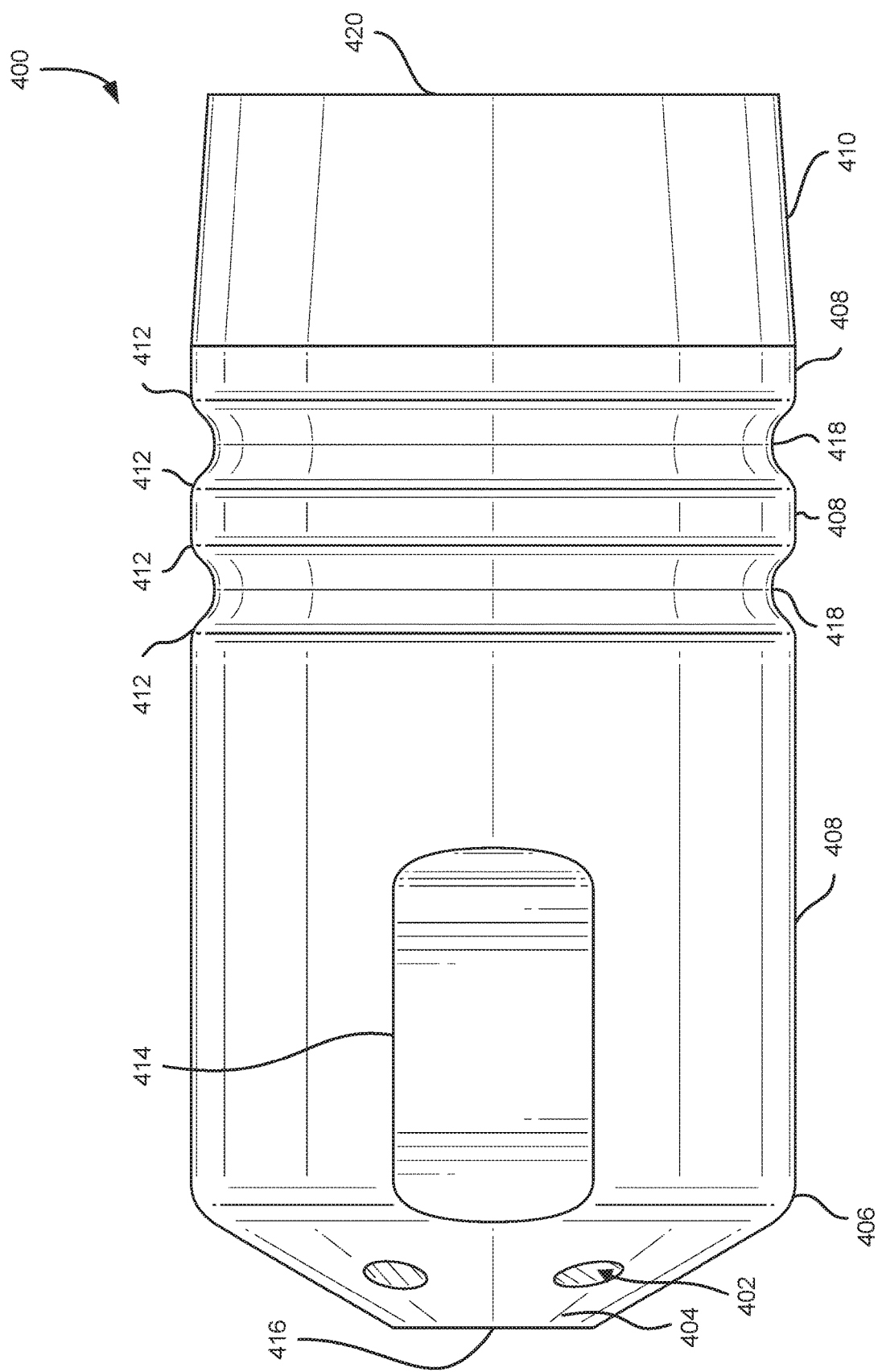

FIG. 27 is a rear view of a nozzle structure in accordance with an embodiment.

Figure 28:
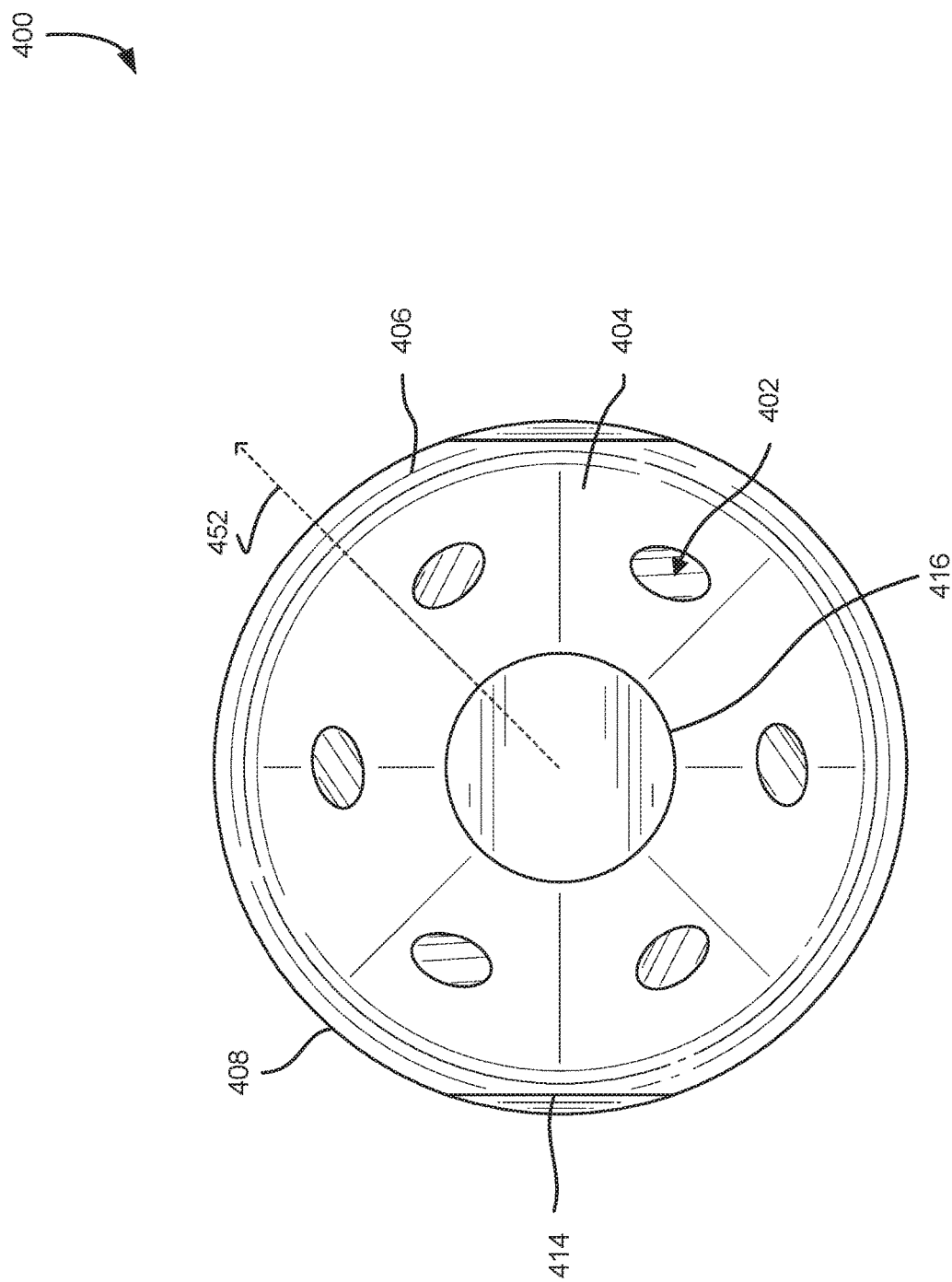

FIG. 28 is a top view of a nozzle structure in accordance with an embodiment.

Figure 29:
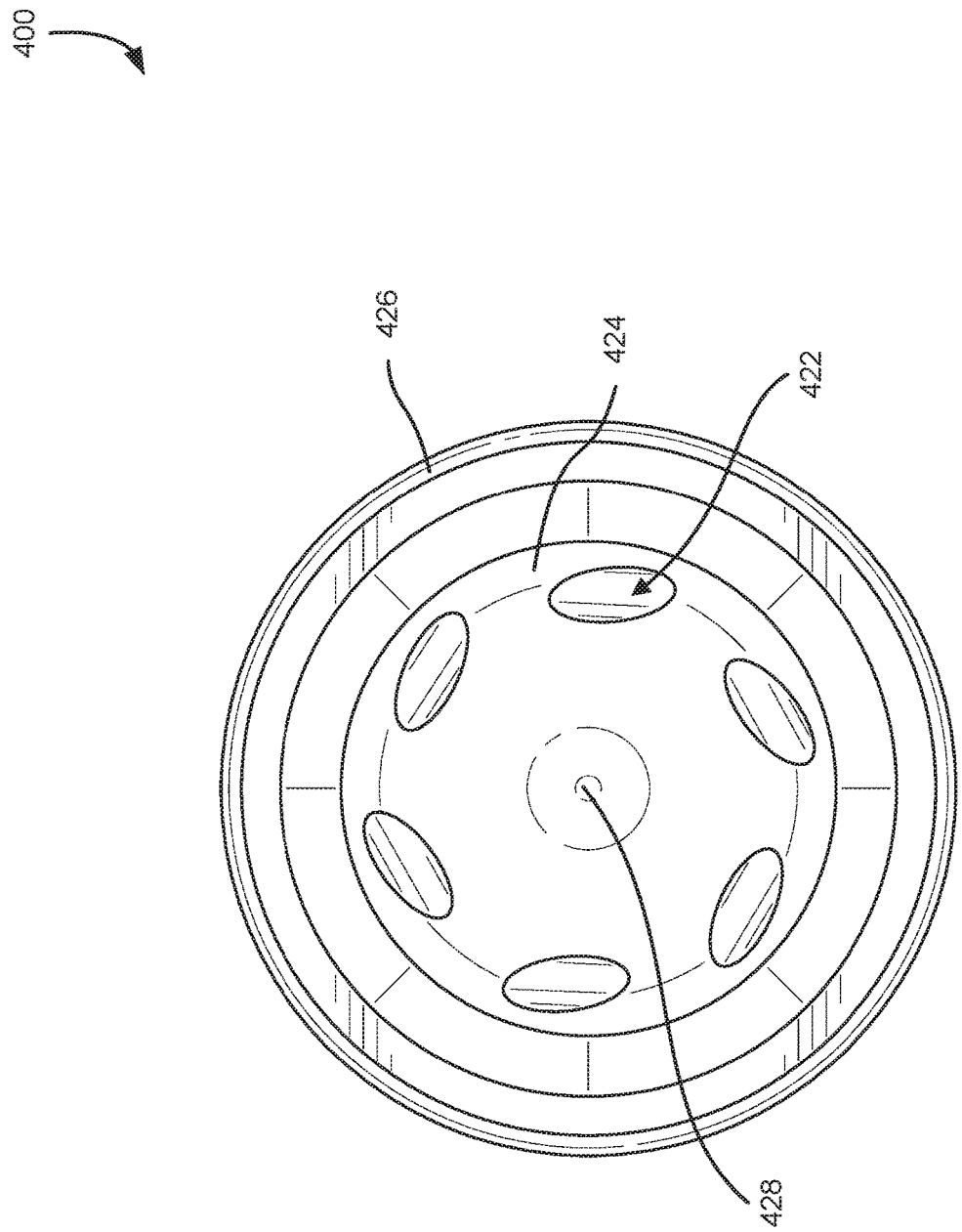

FIG. 29 is a bottom view including an interior view of a nozzle structure in accordance with an embodiment.

Figure 30:
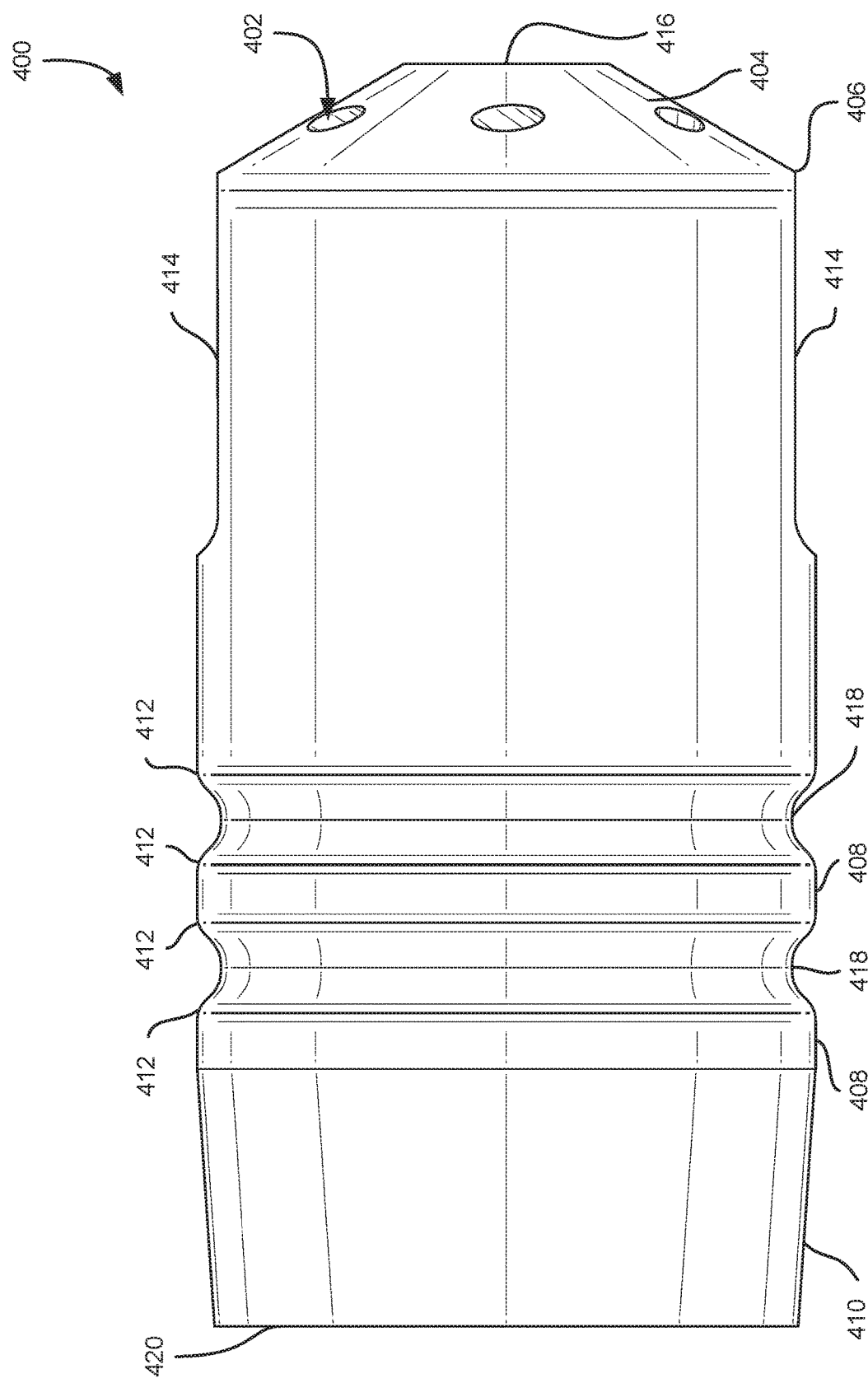

FIG. 30 is a right-side view of a nozzle structure in accordance with an embodiment.

Figure 31:
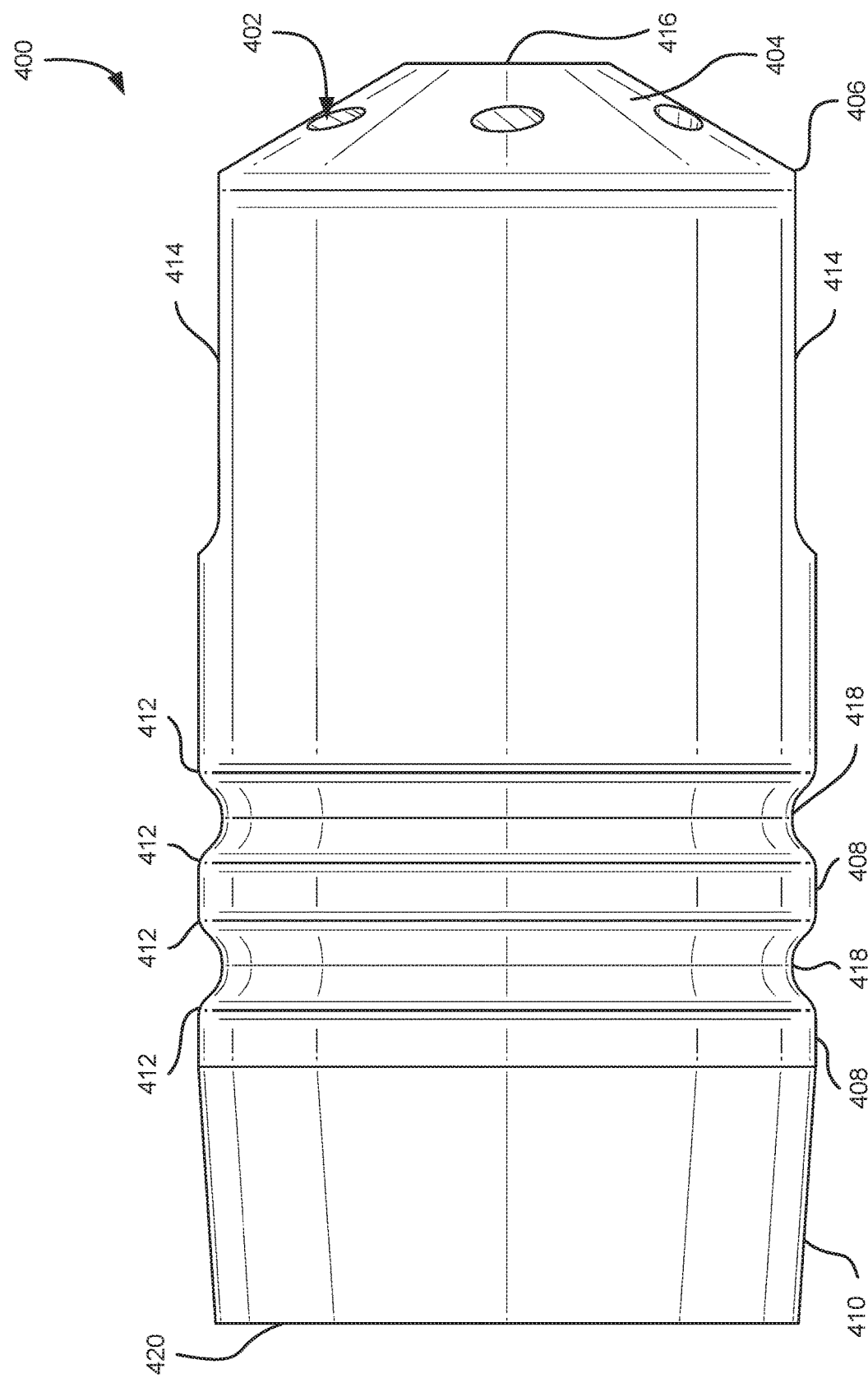

FIG. 31 is a left-side view of a nozzle structure in accordance with an embodiment.

Figure 32:
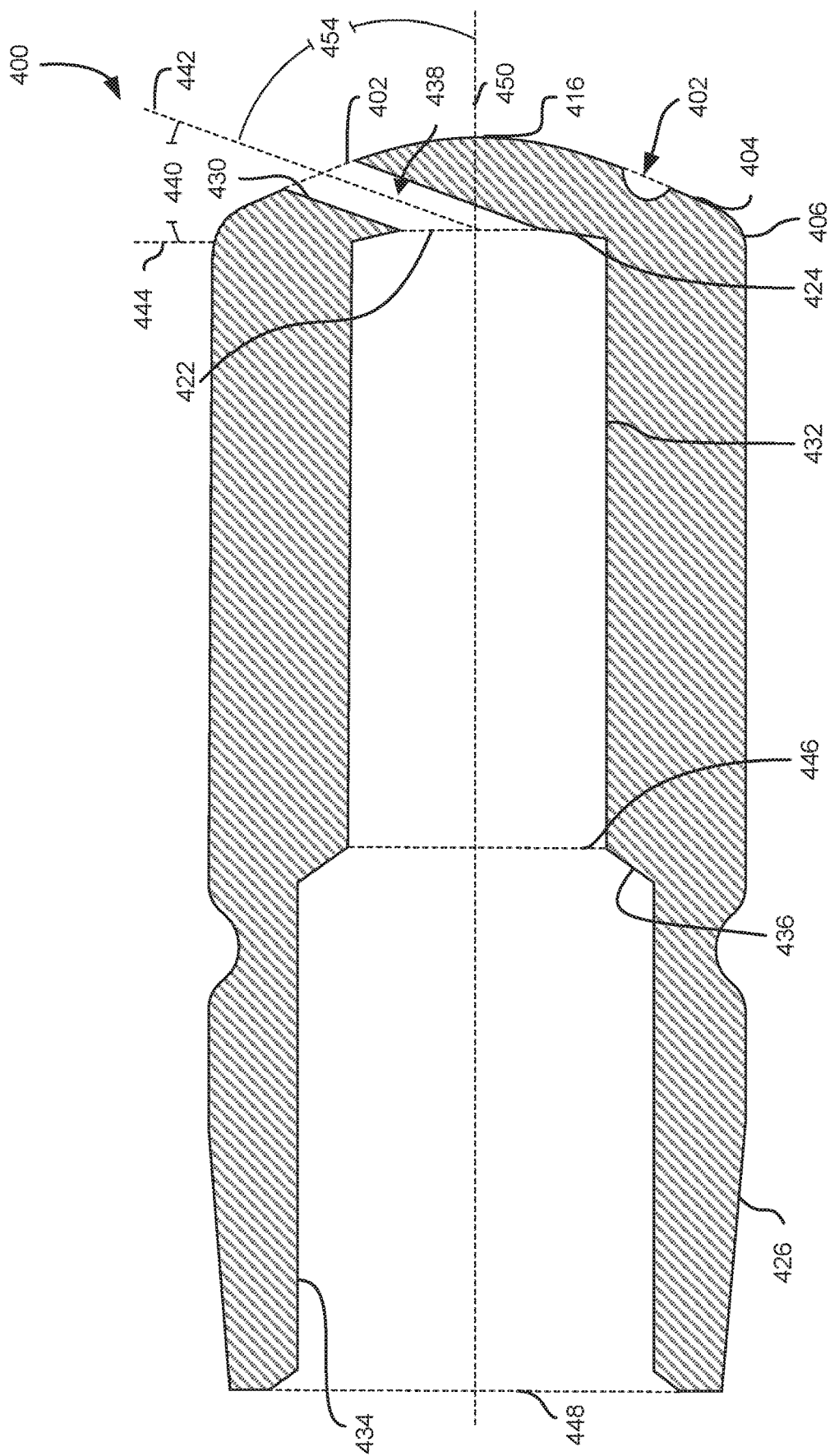

FIG. 32 is a front cross-sectional view of a nozzle structure in accordance with an embodiment.

Figure 33B:
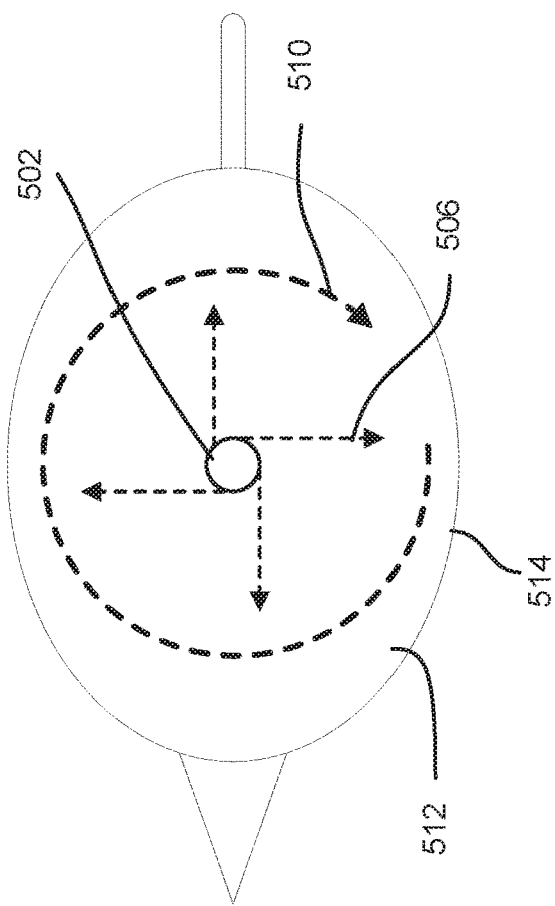
Figure 33A:
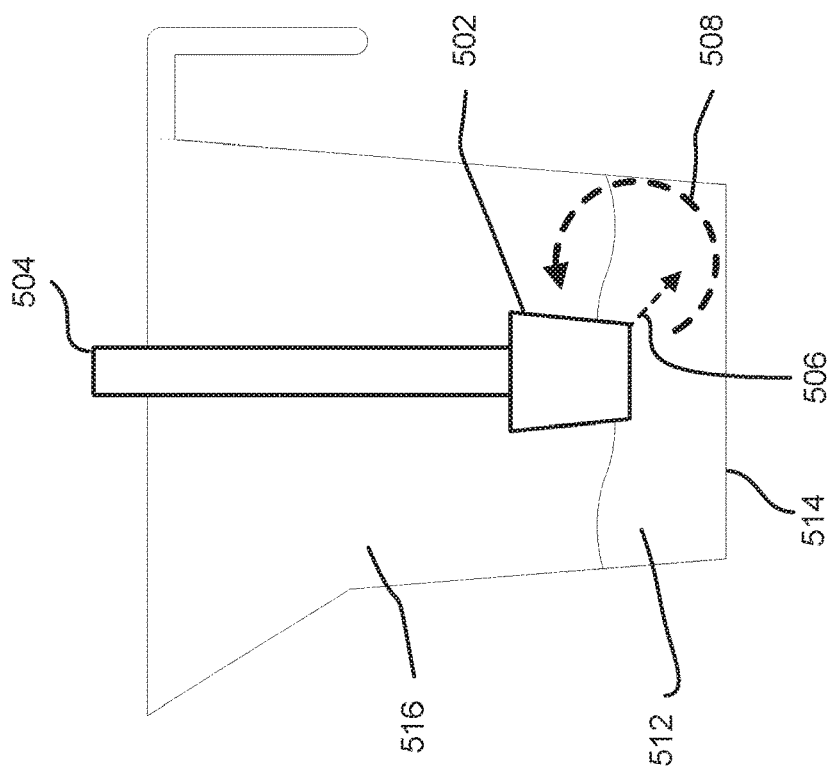

FIG. 33A is a front cross-sectional view of a vessel for use with a nozzle structure in accordance with an embodiment.

FIG. 33B is a top view of a vessel for use with a nozzle structure in accordance with an embodiment.

DETAILED DESCRIPTION

In the following description, numerous specific details are set forth such as specific nozzle structures, including configurations of nozzle bores, flow paths, methods of operation, and nozzle parameters, etc. in order to provide a thorough understanding of the present invention. It will be obvious to one skilled in the art that these specific details may not be needed in order to practice the present invention. In other instances, well-known attributes of nozzle structures have not been described in detail in order to avoid unnecessarily obscuring the present invention. Examples should be taken as being illustrative in nature and not limiting to the scope of the disclosure.

Such nozzle structures contemplated by the invention may be configured to function with various beverage machines that have steam generators built in. For example, espresso machines by La Marzocco, Breville, Astoria Perla, Rocket Espresso, etc., have manually operated steam generators and steam wands. Other espresso machines, such as by Miele, DeLonghi, Keurig, etc., are more automated. Steam generators may also be configured to facilitate other beverages including a frothed component, such as lattes, cappuccinos, flat whites, Cortados, macchiatos, and breves. As one skilled in the art will appreciate in light of this disclosure, such nozzle structured contemplated in this disclosure may be adapted for frothing animal milk, plant-based substitutes for animal milk, or other liquids that may be frothed or foamed.

It should also be understood that there is no intention to limit the nozzle structures to the specific form or forms disclosed for use with such machines but, on the contrary, the intention is to cover all modifications, alternative constructions, and equivalents falling within the spirit and scope of the invention, as defined in the appended claims, to function with manually operated and automated machines.

Various examples described below demonstrate nozzle structures to direct a flow path of a source fluid into a target fluid, such as for steaming milk to produce consistent, high-quality frothed milk with less input and skill on behalf of an operator than required with conventional milk frothing tools. This advantage and others to become apparent as the specification progresses, are accomplished by the invention, according to which, briefly stated, the nozzle having a hollow, cylindrical body, wherein a source fluid enters an intake opening and exits through multiple nozzle bores. The source fluid source may be a steam source structure, such as a tube, for delivering steam from a steam generator in an espresso machine. Source fluids other than steam may be contemplated for acting as frothing/foaming agents.

Each nozzle bore, or nozzle aperture, as an inlet in communication with the intake end of the nozzle and an outlet through which the source fluid flowing from the source is discharged into a target fluid. As described below, the source fluid exiting the nozzle may be directed down, such as at an acute angle, away from the intake, while also outward relative to the nozzle body's center, such as at approximately a right angle relative to the nozzle body's lateral axis. Each nozzle bore may be positioned to direct the source fluid in a direction different from other nozzle bores. While some embodiments contemplate that each nozzle bore is substantially straight, other configurations of nozzle bores may be contemplated, such as a curved nozzle bore.

When submerged in the target fluid, such as milk, a flow current associated with the source fluid, such as steam, exiting these nozzle bores causes the target fluid to rotate within the vessel. Additionally, due to the downward angle of the nozzle apertures, a portion of the flow current further induces vertical mixing. Such a resulting whirlpool effect in the target fluid is can be referred to as rolling. Under these conditions, the source fluid is evenly distributed throughout the target fluid as it swirls around the nozzle. For example, the orientation of the nozzle bores may cause the source fluid, such as steam, to swirl within the target fluid, such as milk, thereby rolling in ambient air into the resulting whirlpool/vortex of mixed fluids to yield an aerated mixture, such as frothed milk, Other target fluids may be contemplated for yielding an aerated mixture.

Markings on the nozzle's exterior may indicate to an operator that the nozzle body is immersed at a sufficient depth to cause the exiting steam to induce milk rolling within a milk vessel. A plurality of markings may be utilized to indicate the depth necessary to produce a desired amount of milk foam. Using this, an unskilled operator can, with minimal effort, froth milk to yield milk foam.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: improve mixing of target fluid and source fluid; improve aeration; in specific embodiments, produce more milk foam in less time compared to traditional nozzles, and reduce cognitive load of an operator.

Figure 1:
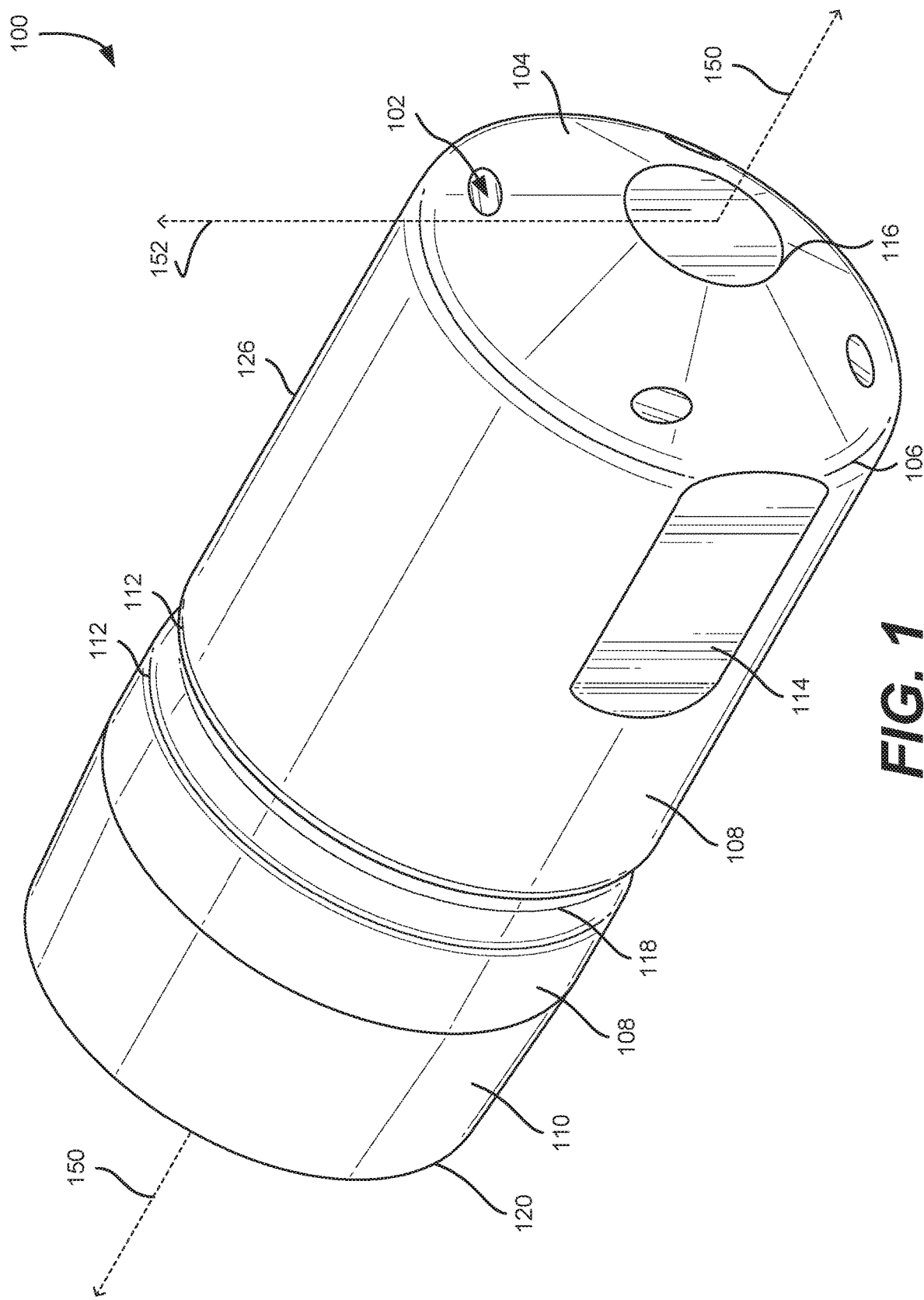
FIG. 1 is a front perspective view of a nozzle structure in accordance with an embodiment.

FIG. 1 is a front perspective view of a nozzle structure 100 in accordance with an embodiment. In an embodiment, nozzle structure 100 comprises a nozzle surface 104. In an embodiment, the nozzle surface 104 begins at a nozzle intake end 106 and terminates at a nozzle outtake end 116 opposite the intake end 106 along a longitudinal axis 150. In an embodiment, the nozzle surface 104 comprises a plurality of outlets 102. In an embodiment, the plurality of outlets 102 are uniformly distributed about the periphery of the nozzle surface 104, although non-uniform distributions are considered as being within the scope of the present disclosure.

In an embodiment, the nozzle structure 100 comprises a nozzle body 126. In an embodiment, the nozzle body 126 comprises a source end 120, which is opposite the nozzle intake end 106. In an embodiment, the nozzle body 126 is in communication with the nozzle surface 104. In an embodiment, the nozzle body 126 and nozzle surface 104 are in axial alignment about the longitudinal axis 150. In an embodiment, the nozzle body 126 comprises an exterior body surface 108. In an embodiment, the exterior body surface 108 is in communication with the nozzle surface 104. In an embodiment, the exterior body surface 108 is approximately cylindrical. In an embodiment, the nozzle body 126 comprises a transition region 110 between the source end 120 and the exterior body surface 108. In an embodiment, the transition region 110 is tapered.

In an embodiment, the nozzle body 126 is formed to define a plurality of ridges 114. In an embodiment, the plurality of ridges 114 are distributed about the periphery of the nozzle body 126. In an embodiment, the plurality of ridges 114 include at least two ridges. The plurality of ridges 114 may be suitably sized and spaced to interact with a gripping tool for attaching or removing the nozzle body 126 from a source fluid source. In an embodiment, the plurality of ridges 114 are substantially flat. In another embodiment, the nozzle body 126 defines one or more exterior grooves 118 between the source end 120 and the nozzle intake end 106. In an embodiment, the one or more exterior grooves 118 extend around the nozzle body 126. In an embodiment, the nozzle body 126 comprises one or more groove edges 112. In an embodiment, the one or more groove edges 112 are disposed on either side of the one or more external grooves 118. In an embodiment, the one or more groove edges 112 comprise rounded or angular bevels to offset the one or more external grooves 118.

Figure 2:
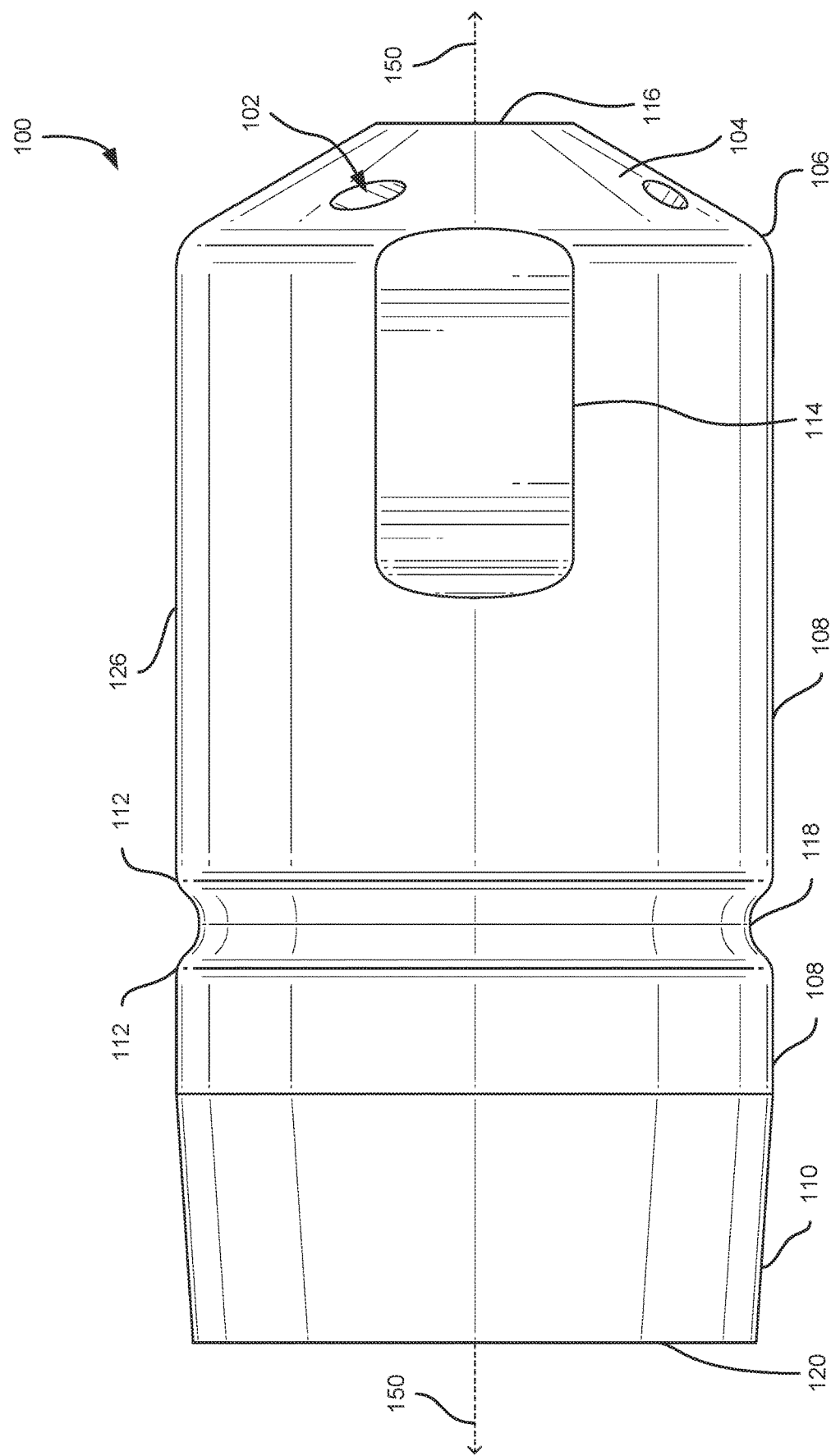
FIG. 2 is a front view of a nozzle structure in accordance with an embodiment.

FIG. 2 is a front view of the nozzle structure 100 encompassing at least some of the embodiments described in FIG. 1. The nozzle structure 100 may be constructed of stainless steel, such as 303 Stainless Steel. The length of the nozzle body 126 from source end 120 to outtake end 116 may be approximately 25.40 millimeters (mm). The width of the nozzle body 126 may be approximately 12.40 mm, tapering within the transition region 110 to a width of approximately 11.70 mm at the source end 120. The transition region 110 may have a length of approximately 5.15 mm. The plurality of ridges 114 may start at a length of approximately 16.24 min as starting from the source end 120. The center of an external groove 118 may be positioned at approximately 8.69 mm from the source end 120. The external groove 118 may indicate that the nozzle structure 100 should be submerged at approximately 16 mm-17 mm into a volume a milk contained within a vessel, such as a pitcher. In an embodiment, the vessel may contain approximately 4 fluid ounces (oz.) of a target liquid. In an alternate embodiment, the vessel may contain approximately 30 oz. of a target liquid. As may be appreciated by one skilled in the art, the vessel may contain between approximately 4 oz. and 30 oz. of a target liquid. The center of an outlet of the plurality of outlets 102 may be positioned approximately 3.30 mm offset from the center of the outtake end 116.

Figure 3:
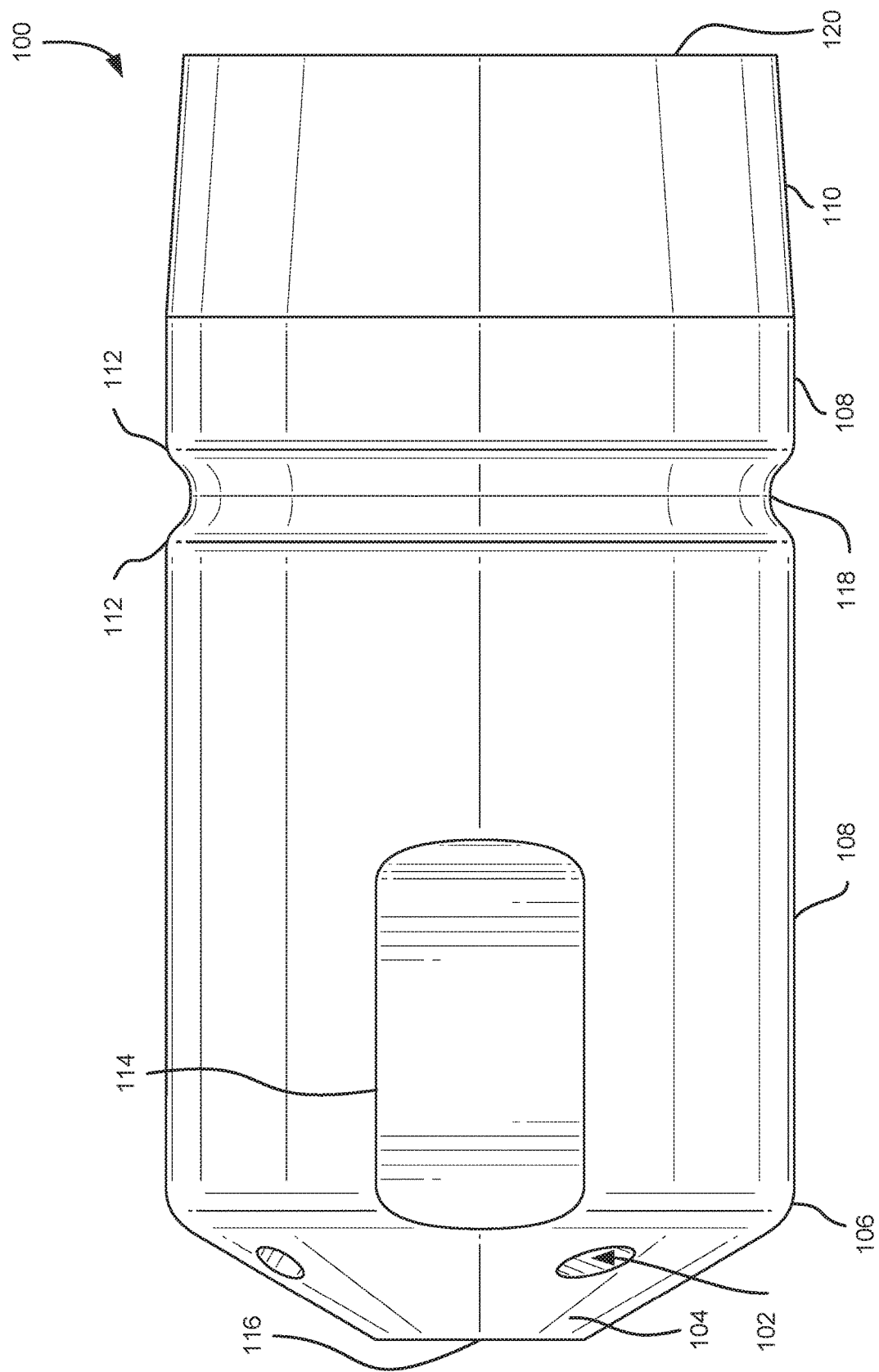
FIG. 3 is a rear view of a nozzle structure in accordance with an embodiment

FIG. 3 is a rear view of the nozzle structure 100 encompassing at least some of the embodiments described in FIGS. 1 and 2.

Figure 4:
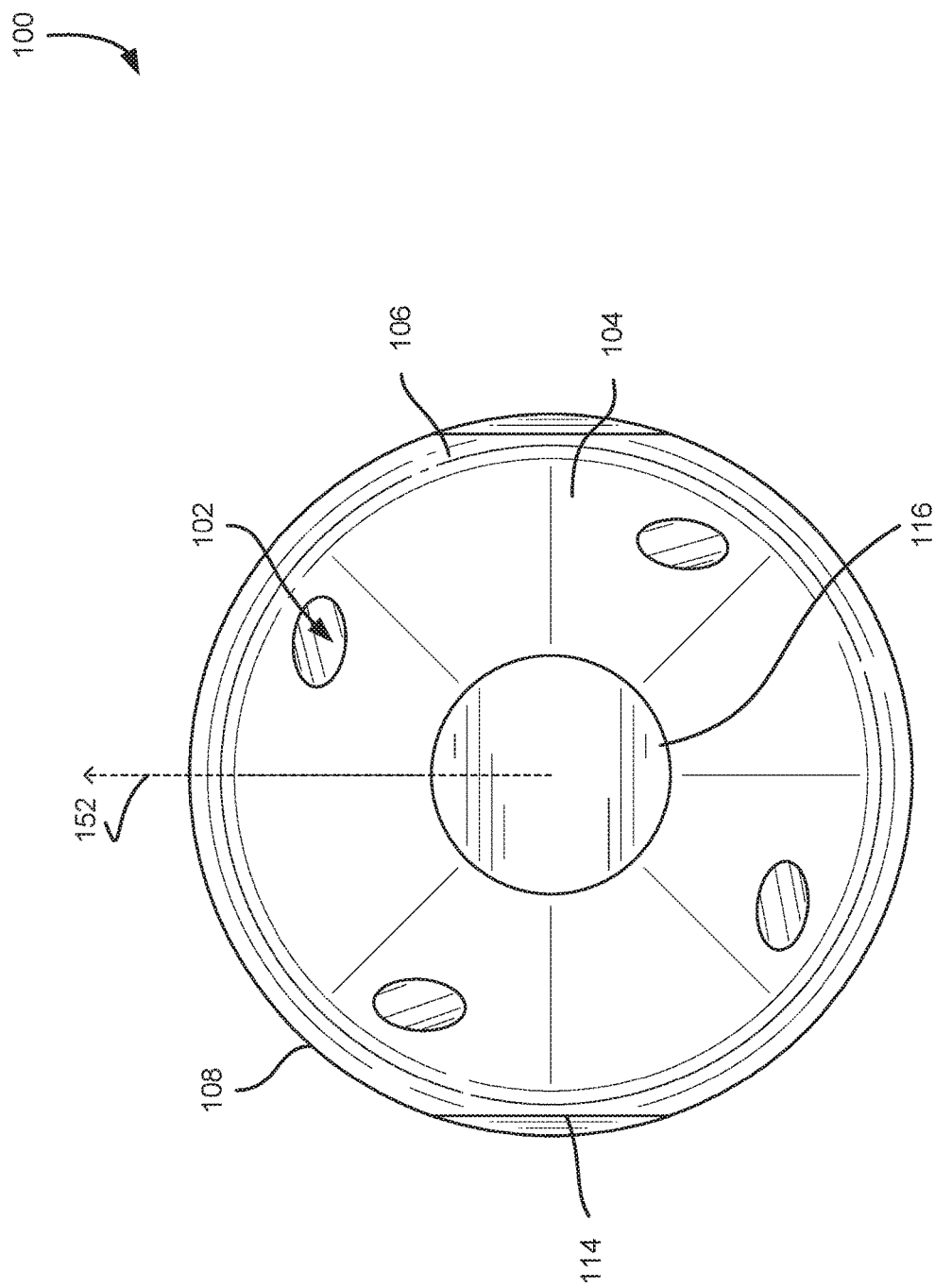
FIG. 4 is a top view of a nozzle structure in accordance with an embodiment.

FIG. 4 is a top view of the nozzle structure 100 encompassing at least some of the embodiments described in FIGS. 1-3. In an embodiment, the plurality of outlets 102 is four outlets. In an alternate embodiment, the plurality of outlets 102 comprises an odd number of outlets. In an embodiment, an individual outlet of the plurality of outlets 102 is orientated orthogonally to a lateral axis 152 associated with the center of the nozzle structure 100. In an embodiment, the plurality of ridges 114 are uniformly distributed about the periphery of the nozzle body 126. In an embodiment, the plurality of ridges 114 intersect the nozzle intake end 106.

Figure 5:
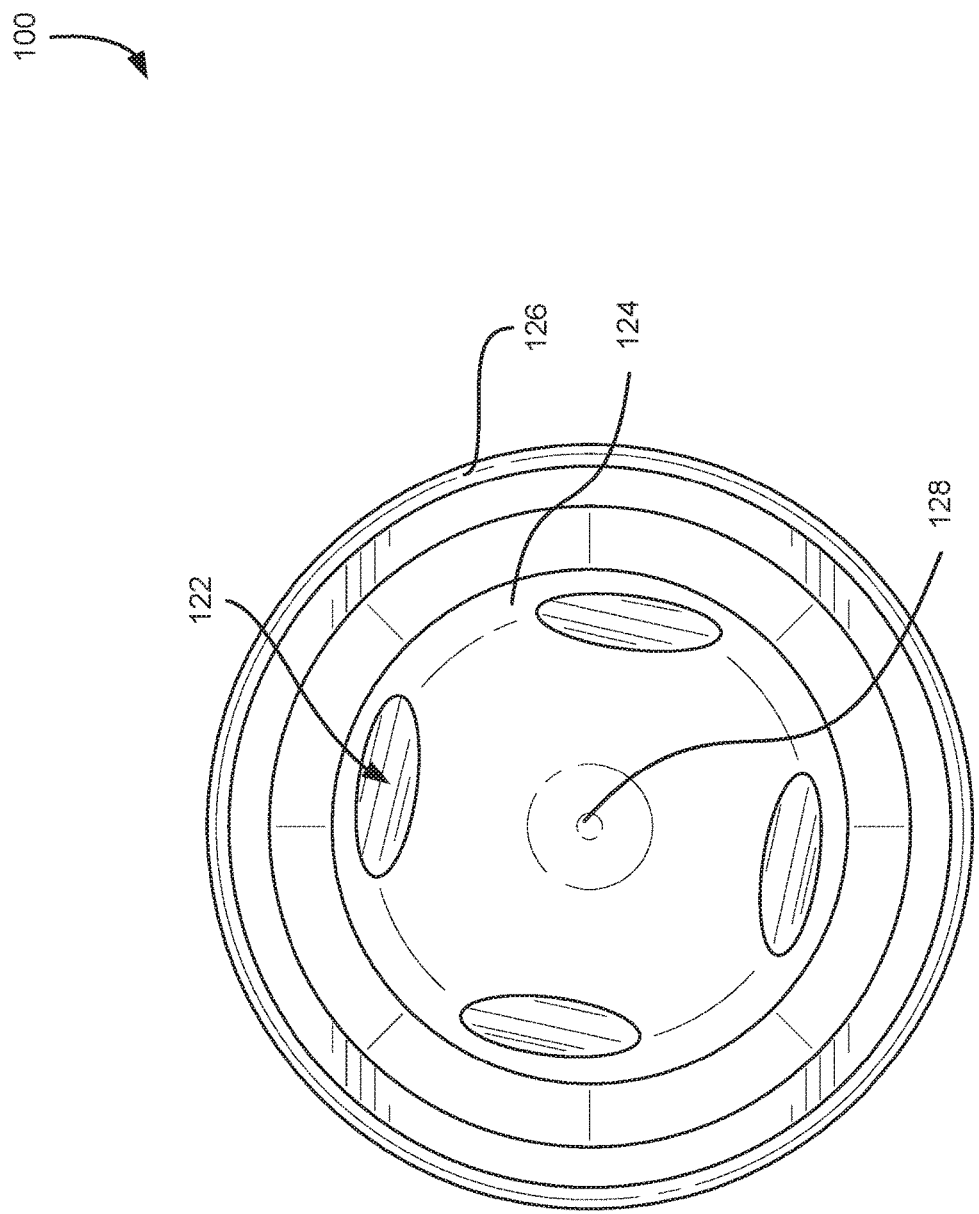
FIG. 5 is a bottom view including an interior view of a nozzle structure in accordance with an embodiment.

FIG. 5 is a bottom view including an interior view of the nozzle structure 100 encompassing at least some of the embodiments described in FIGS. 1-4. In an embodiment, the nozzle structure 100 comprises an interior nozzle surface 124. In an embodiment, the interior nozzle surface 124 is substantially conical, approximating a frustum of a cone. In an embodiment, the interior nozzle surface 124 is interrupted by a plurality of inlets 122, each inlet of the plurality of inlets 122 in communication with a corresponding outlet of the plurality of outlets 102. In an embodiment, the plurality of inlets 122 are uniformly distributed about the interior nozzle surface 124 relative to a center 128 of the interior nozzle surface 124. In an embodiment, the plurality of inlets 122 are distributed at the same position relative to the longitudinal axis. In an embodiment, the plurality of inlets 122 are offset from the plurality of outlets 102 relative to the longitudinal axis.

Figure 6:
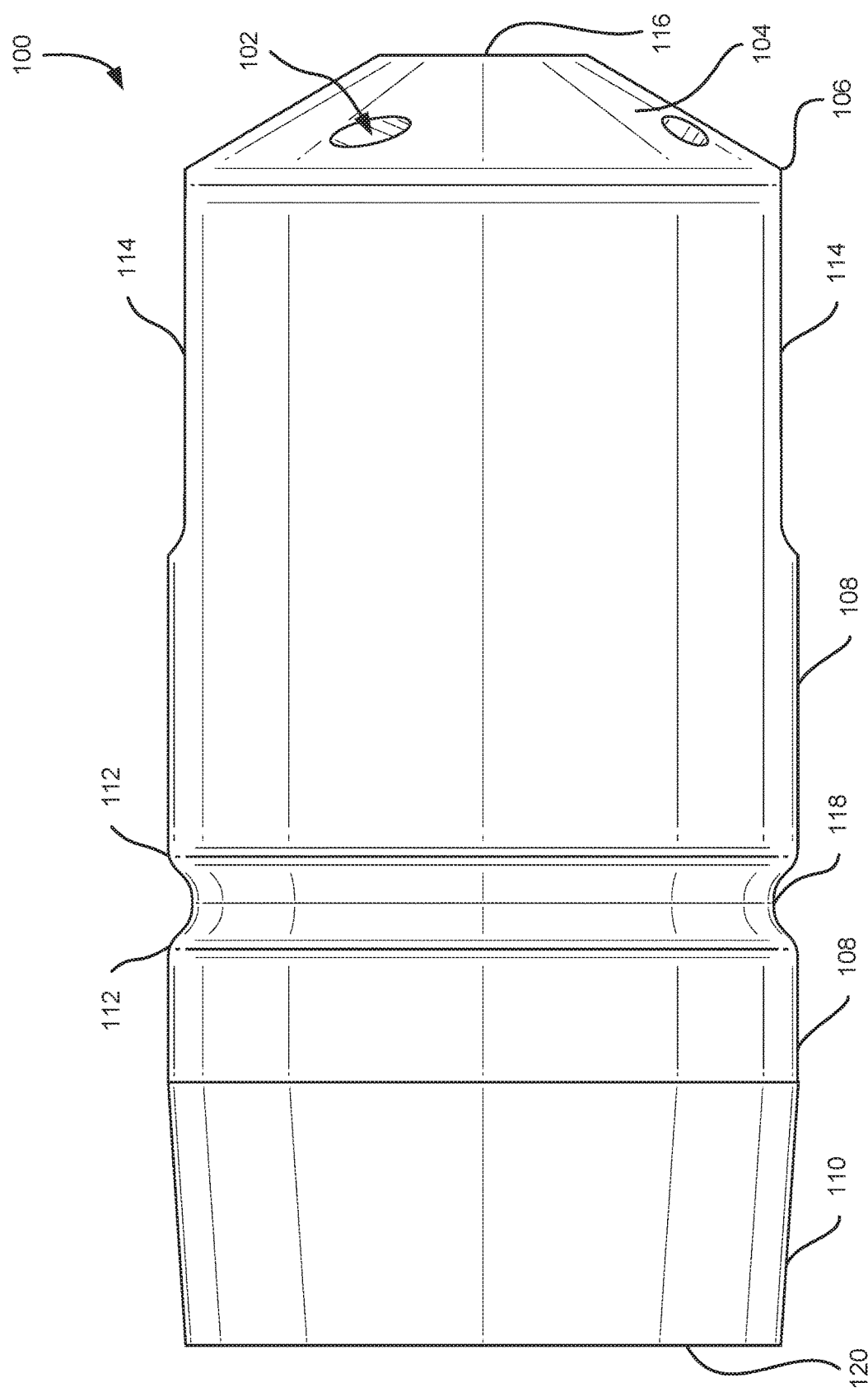
FIG. 6 is a right-side view of a nozzle structure in accordance with an embodiment.

FIG. 6 is a right-side view of the nozzle structure 100 encompassing at least some of the embodiments described in FIGS. 1-5.

Figure 7:
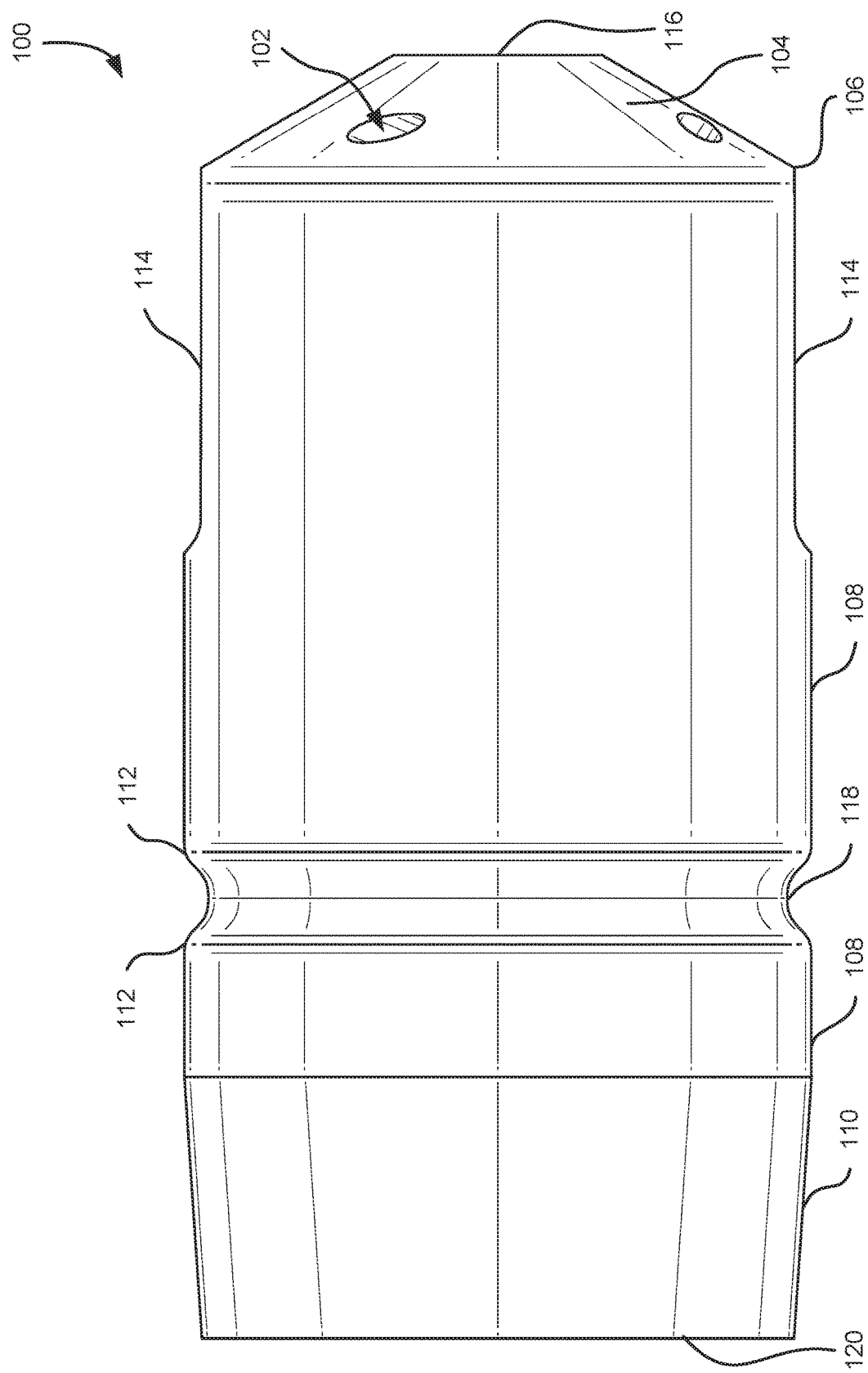
FIG. 7 is a left-side view of a nozzle structure in accordance with an embodiment.

FIG. 7 is a left-side view of the nozzle structure 100 encompassing at least some of the embodiments described in FIGS. 1-6.

Figure 8:
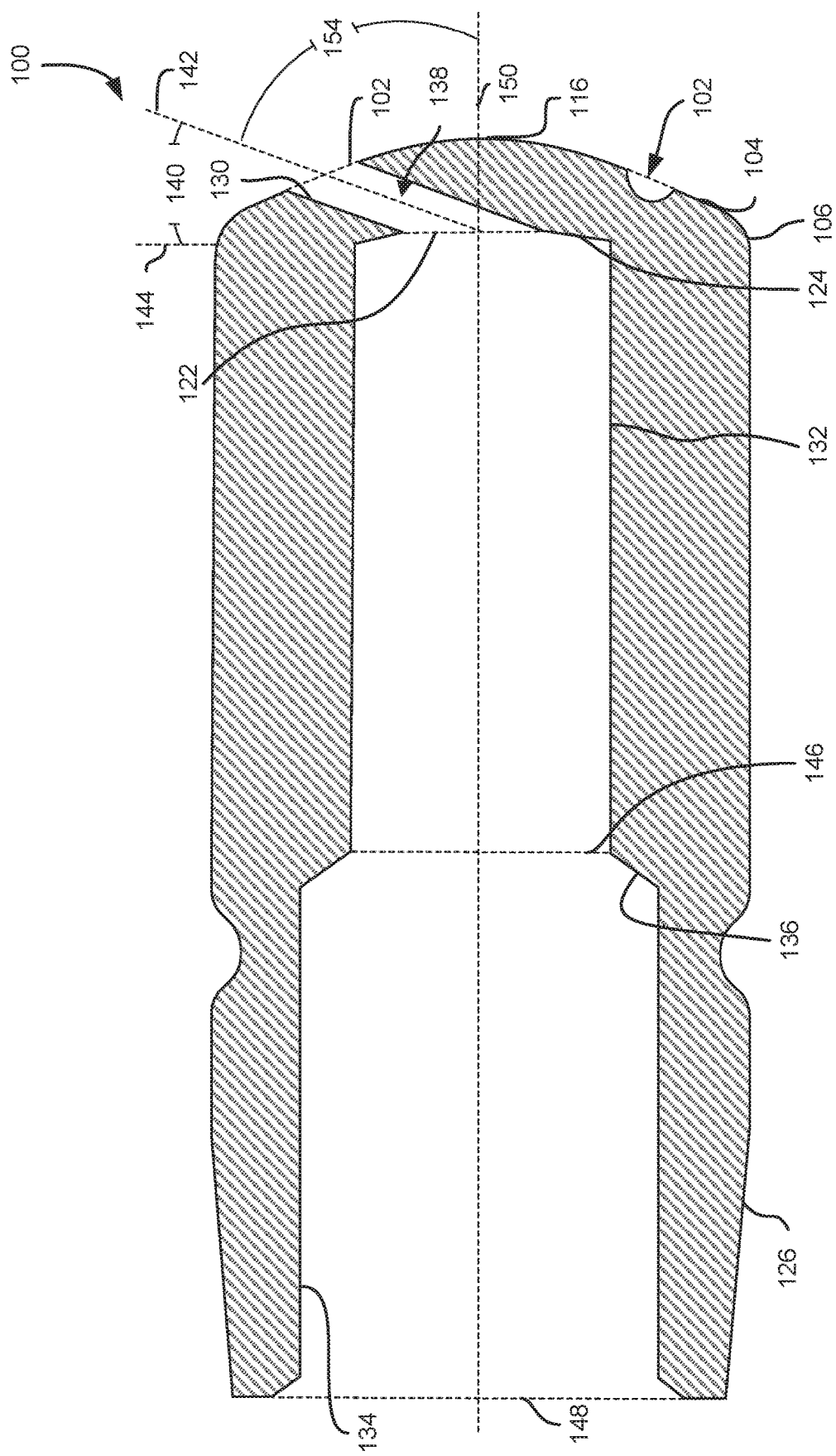
FIG. 8 is a front cross-section of a nozzle structure in accordance with an embodiment.

FIG. 8 is a front cross-sectional view of the nozzle structure 100 encompassing at least some of the embodiments described in FIGS. 1-7. In an embodiment, the nozzle structure 100 forms a plurality of nozzle bores 138, wherein each nozzle bore of the plurality of nozzle bores 138 is in communication with one of the plurality of inlets 122 and one of the plurality of outlets 102. In another embodiment, the plurality of nozzle bores 138 comprises an even number of nozzle bores. In an embodiment, the plurality of nozzle bores 138 includes four nozzle bores. In an alternate embodiment, the plurality of nozzle bores 138 comprises an odd number of nozzle bores. In an embodiment, the plurality of nozzle bores 138 are approximately cylindrical. In an embodiment, each nozzle bore of the plurality of nozzle bores 138 is concentric with a substantially straight bore axis 142. In an embodiment, the plurality of nozzle bores 138 are oriented in the same relative angular direction such that the corresponding straight bore axis 142 are orthogonal to a lateral axis 152 described above and associated with the nozzle surface 104. In an embodiment, an individual nozzle bore of the plurality of nozzle bores 138 is oriented such that the corresponding straight bore axis 142 forms an acute angle 140 relative to a plane 144 that is coincident with a source end opening 148 corresponding to the source end 120 described above. In an embodiment, complementary angle 154 is complementary to angle 140, where angle 154 is formed between the corresponding straight bore axis 142 and longitudinal axis 150. In an embodiment, the acute angle 140 is approximately between twenty-degrees) (20°) and approximately thirty-degrees (30°), such that the complementary to angle 140 is between approximately seventy-degrees)(70°) and approximately sixty-degrees) (60°), respectively. In an embodiment, the acute angle 140 is consistent among a majority of the nozzle bores 138. In an embodiment, the acute angle 140 corresponding to each bore axis 142 of the plurality of nozzle bores 138 is approximately twenty-degrees) (20°).

In an embodiment, the nozzle body 126 comprises an interior nozzle body surface 132. In an embodiment, the interior nozzle body surface 132 extends from the nozzle intake end 120 in the direction of the source end 120. In an embodiment, the nozzle body 126 comprises an adapter surface 134. In an embodiment, the adapter surface 134 extends from the source end 120 in the direction of the nozzle intake end 106. In an embodiment, the interior nozzle body surface 132 intersects the adapter surface 134 between the source end 120 and the nozzle intake end 120. In an embodiment, the adapter surface 134 is precisely measured to fit around and removeably attached to an otherwise not-illustrated male-type fluid source of corresponding shape, whereby the adapter surface 134 is in communication with the source fluid's source. In an embodiment, the nozzle structure 100 may be connected to the fluid source by friction between the adapter surface 134 and fluid source. In another embodiment, a portion of adapter surface 134 comprises threads, such that a portion of the adapter surface 134 may be an internally threaded end. In an embodiment, the nozzle body 126 comprises an interior ridge 136. In an embodiment, the interior ridge 136 is disposed between the interior nozzle body surface 132 and the adapter surface 134. In an embodiment, the interior ridge 136 comprises a rubber gasket. The adapter surface 134 may define an interior space with a width of approximately 8.33 mm.

In accordance with an embodiment, a source fluid enters the nozzle structure 100 via the source end 120, constituting a flow path. In an embodiment, source fluid is introduced to the nozzle intake end 106 constitutes a flow path through each of the plurality of inlets 122 and into corresponding nozzle bores 138. Source fluid flowing through the plurality of nozzle bores 138 may then be discharged through the plurality of outlets 102, which may yield a flow current. When the nozzle structure 100 is submerged in a target liquid, the flow current associated with the source fluid, such as steam, exiting the nozzle bores 138 may induce rotation of the target liquid. The induced rotation of the target fluid may be counter-clockwise, as induced by the orientation of the nozzle bores 138. Other directionality of the induced rotation may be contemplated by the orientation of the nozzle bores 138. Due to the angle 140 of the nozzle bores 138 and corresponding straight bore axis 142, a portion of the flow current may further induce a vertical mixing of the target liquid. This horizontal and vertical mixing, or rolling, may mix the source fluid into target liquid. In an embodiment the flow path of the source liquid, such as steam, may be directed through the nozzle bores 138 such that the target liquid, such as milk, may be aerated. In an embodiment, the position of the one or more exterior grooves 118 relative to the longitudinal axis 150 may be utilized to indicate a depth at which to submerge the nozzle structure 100 in the target liquid. In an embodiment, the plurality of ridges 114 are may be utilized in conjunction with a wrench or other instrument to connect or disconnect the nozzle body 126 and fluid source.

Figure 9:
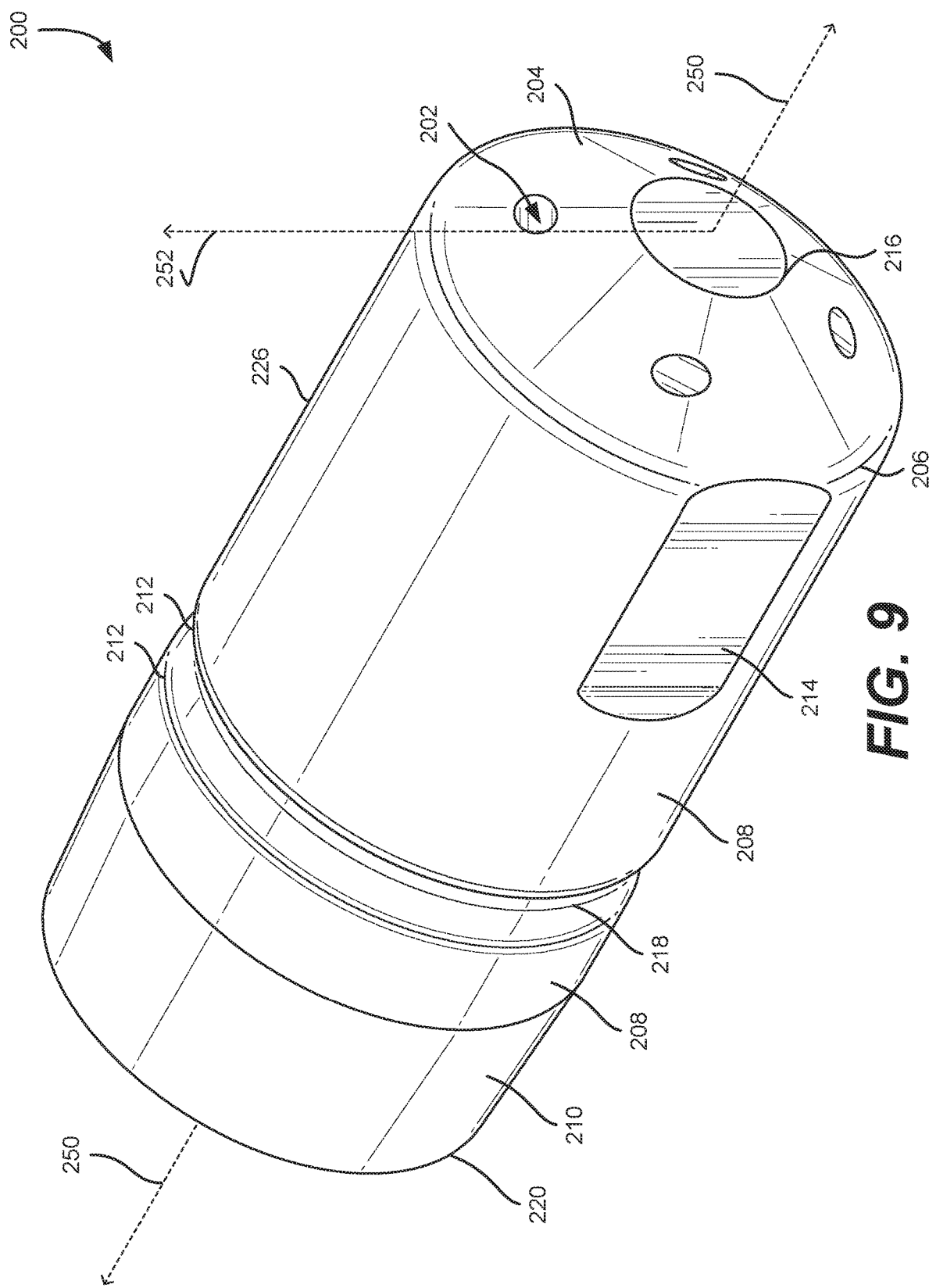
FIG. 9 is a front perspective view of a nozzle structure in accordance with an embodiment.

FIG. 9 is a front perspective view of a nozzle structure 200 in accordance with at least one embodiment and illustrating an alternative configuration of the nozzle structure 100 illustrated in FIG. 1 as described herein. In an embodiment, a nozzle surface 204 is similar to nozzle surface 104. In an embodiment, a plurality of outlets 202 are similar to plurality of outlets 102. In an embodiment, a nozzle intake end 206 is similar to nozzle intake end 106. In an embodiment, a nozzle outtake end 216 is similar to nozzle outtake end 116.

In an embodiment, a nozzle body 226 is similar to nozzle body 126. In an embodiment, a source end 220 is similar to source end 120. In an embodiment, a longitudinal axis 250 is similar to longitudinal axis 150. In an embodiment, an exterior body surface 208 is similar to exterior body surface 108. In an embodiment, a transition region 210 is similar to transition region 110. In an embodiment, a plurality of ridges 214 are similar to plurality of ridges 114. In an embodiment, one or more exterior grooves 218 are similar to one or more exterior grooves 118. In an embodiment, one or more groove edges 212 are similar to one or more groove edges 112. In an embodiment, a lateral axis 252 is similar to the lateral axis 152.

Figure 10:
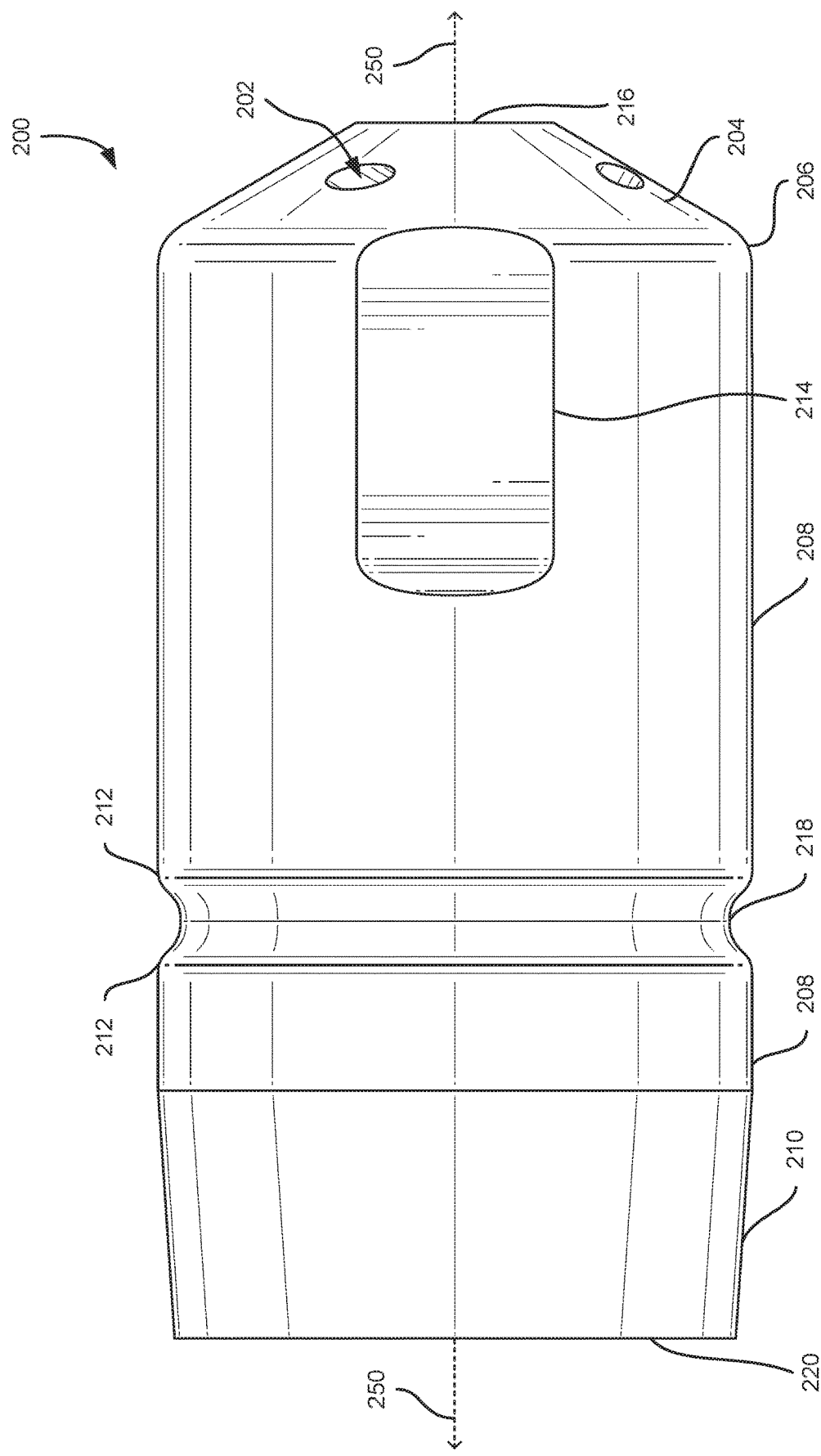
FIG. 10 is a front view of a nozzle structure in accordance with an embodiment.

FIG. 10 is a front view of an embodiment of the nozzle structure 200 in accordance with at least one embodiment and illustrating an alternative configuration of the nozzle structure 100 illustrated in FIG. 2 as described herein.

Figure 11:
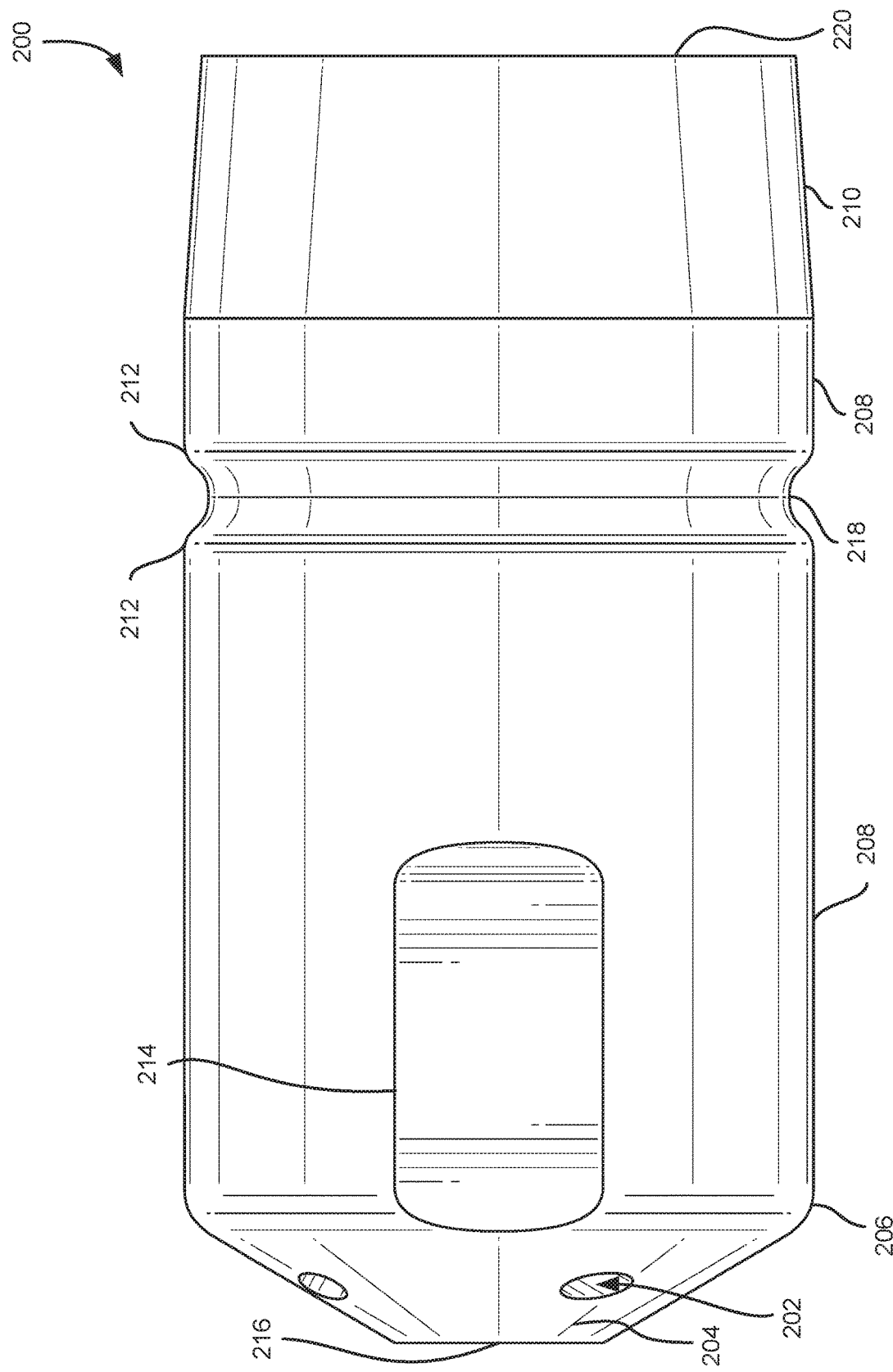
FIG. 11 is a rear view of a nozzle stricture in accordance with an embodiment.

FIG. 11 is a rear view of the nozzle structure 200 in accordance with at least one embodiment and illustrating an alternative configuration of the nozzle structure 100 illustrated in FIG. 3 as described herein.

Figure 12:
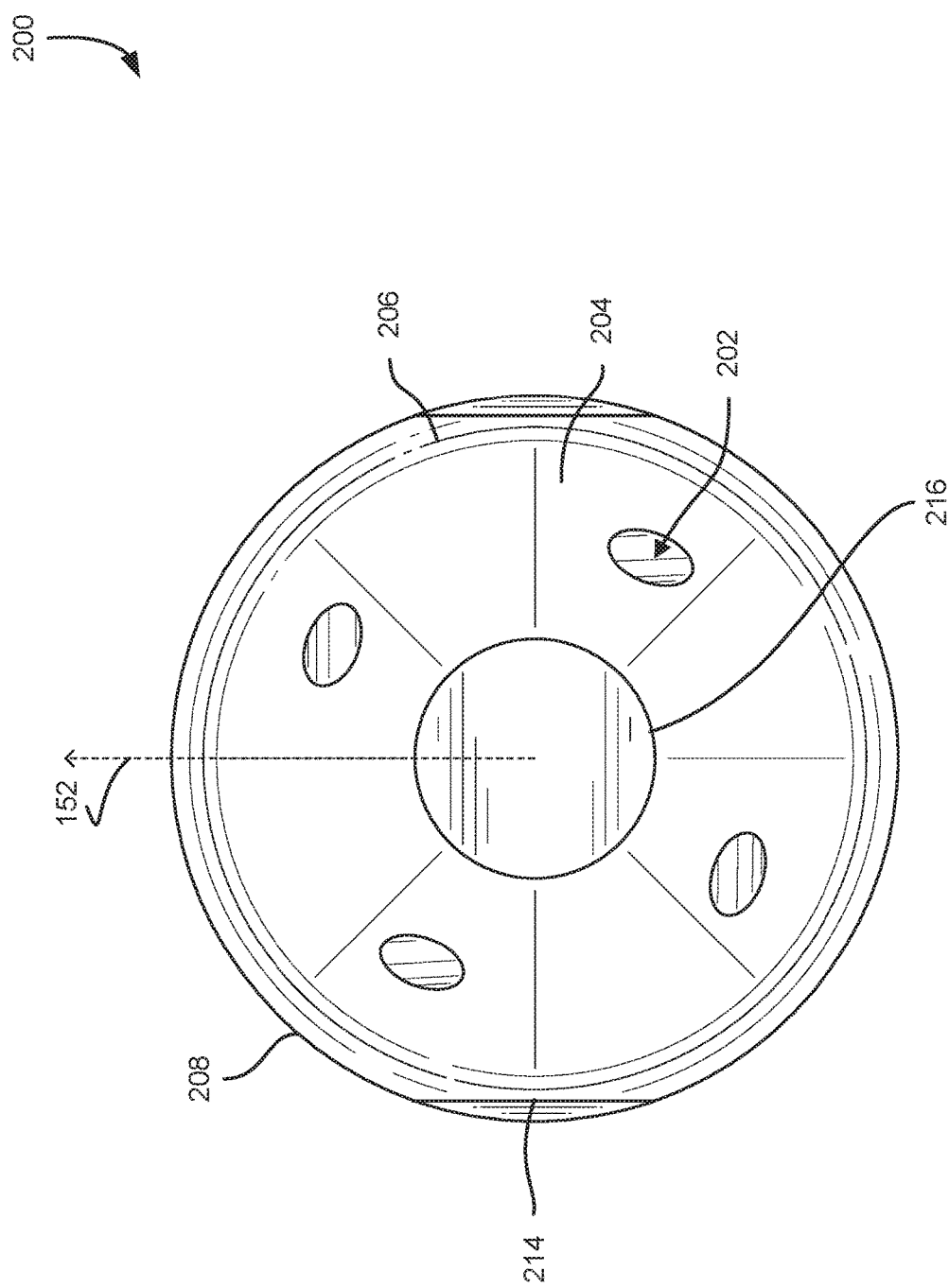
FIG. 12 is a top view of a nozzle structure in accordance with an embodiment.

FIG. 12 is a top view of the nozzle structure 200 in accordance with at least one embodiment and illustrating an alternative configuration of the nozzle structure 100 illustrated in FIG. 4 as described herein.

Figure 13:
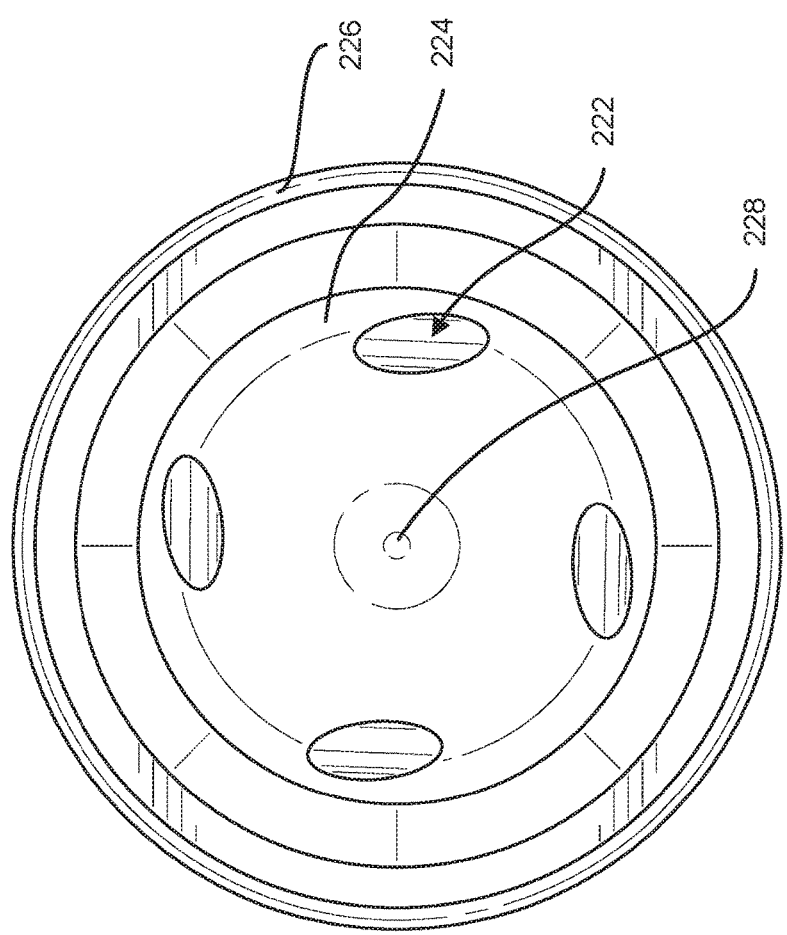
FIG. 13 is a bottom view including an interior view of a nozzle structure in accordance with an embodiment.

FIG. 13 is a bottom view of the nozzle structure 200 in accordance with at least one embodiment and illustrating an alternative configuration of the nozzle structure 100 illustrated in FIG. 5 as described herein. In an embodiment, an interior nozzle surface 224 is similar to interior nozzle surface 124. In an embodiment, a center 228 is similar to the center 128. In an embodiment, a plurality of inlets 222 are similar to plurality of inlets 122.

Figure 14:
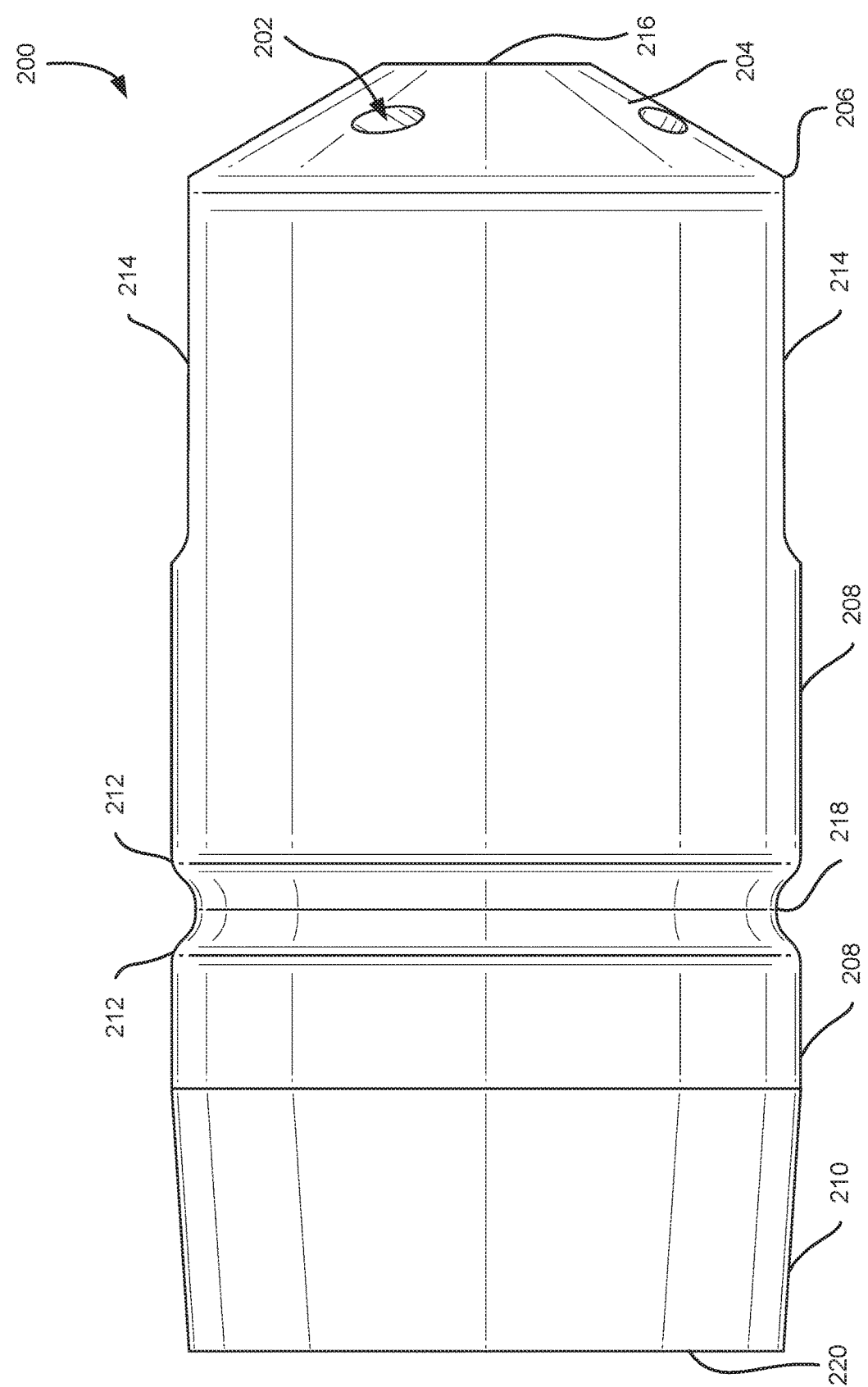
FIG. 14 is a right-side view of a nozzle structure in accordance with an embodiment.

FIG. 14 is a right-side view of the nozzle structure 200 in accordance with at least one embodiment and illustrating an alternative configuration of the nozzle structure 100 illustrated in FIG. 6 as described herein.

Figure 15:
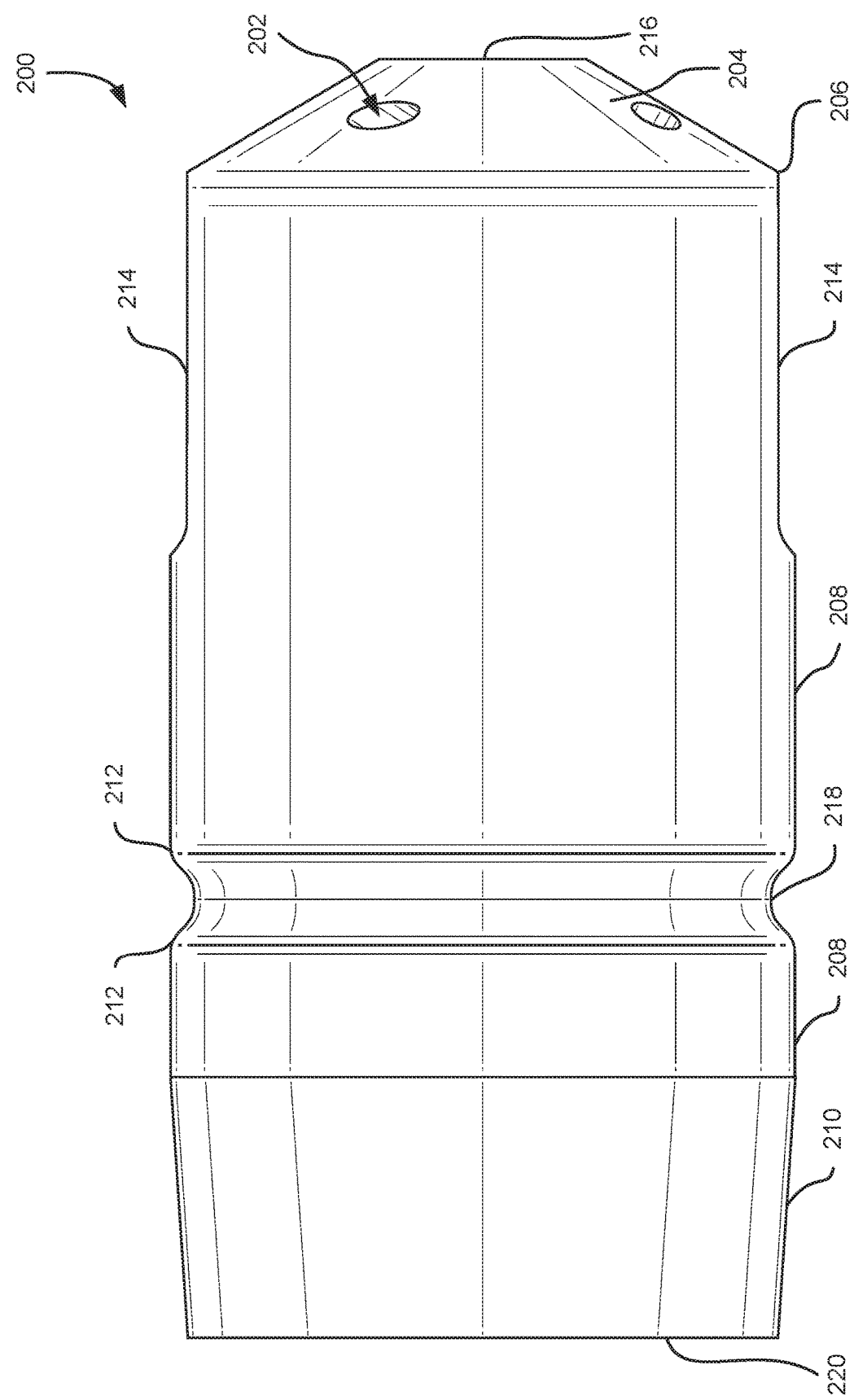
FIG. 15 is a left-side view of a nozzle structure in accordance with an embodiment.

FIG. 15 is a left-side view of the nozzle structure 200 in accordance with at least one embodiment and illustrating an alternative configuration of the nozzle structure 100 illustrated in FIG. 7 as described herein.

Figure 16:
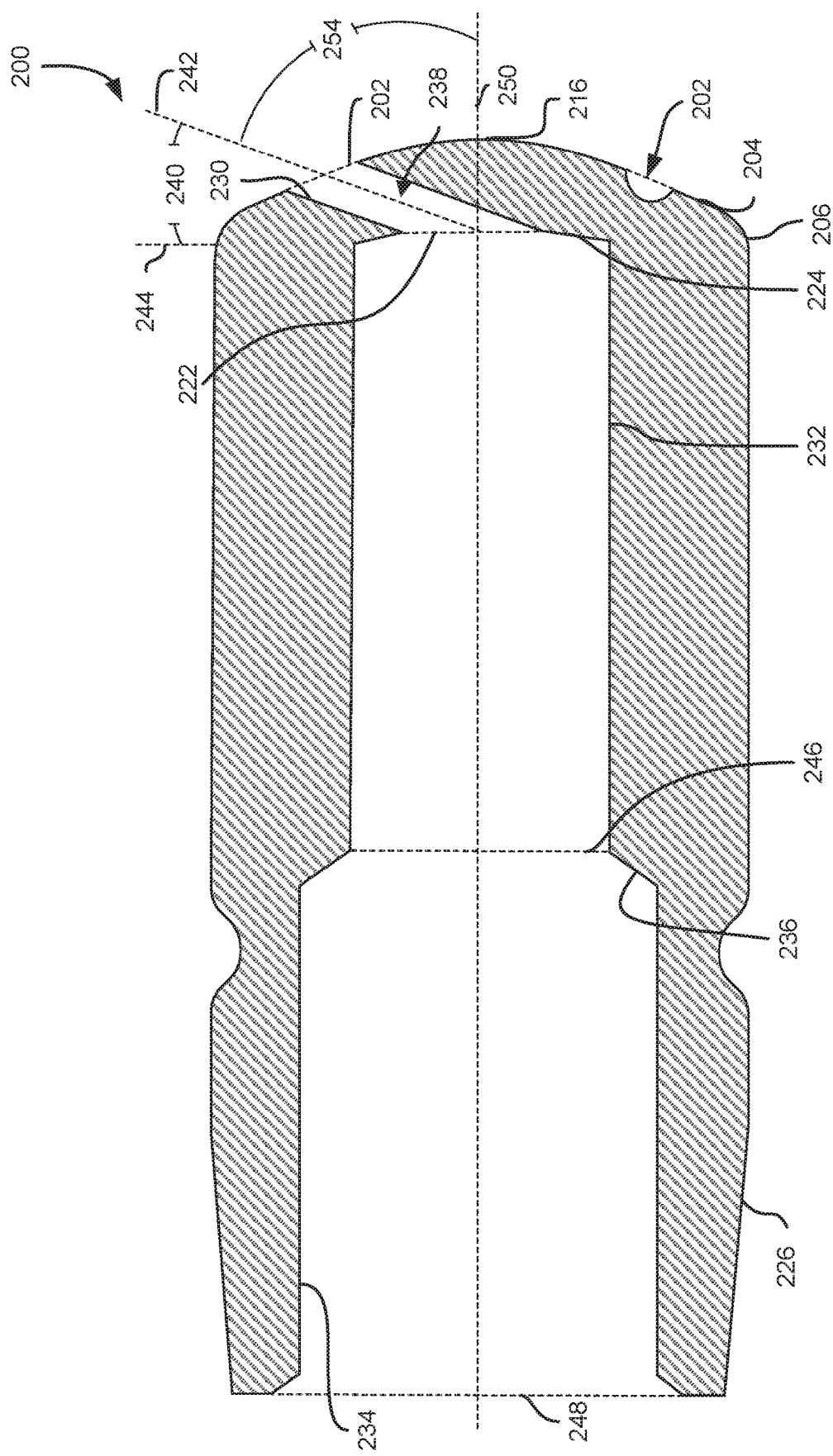
FIG. 16 is a front cross-sectional view of a nozzle structure in accordance with an embodiment.

FIG. 16 is a front cross-sectional view the nozzle structure 200 in accordance with at least one embodiment and illustrating an alternative configuration of the nozzle structure 100 illustrated in FIG. 8 as described herein. In an embodiment, a plurality of nozzle bores 238 are similar to plurality of nozzle bores 138. In an embodiment, a bore axis 242 is similar to bore axis 142. In an embodiment, a plane 244 is similar to plane 144. In an embodiment, an interior nozzle body surface 232 is similar to interior nozzle body surface 132. In an embodiment, a source end opening 248 is similar to the source end opening 148. In an embodiment, an adapter surface 234 is similar to adapter surface 134. In an embodiment, an interior ridge 236 is similar to interior ridge 136. In an embodiment, an acute angle 240 is similar to acute angle 140. In an embodiment, an angle 254 is similar to angle 154. In an embodiment, the acute angle 240 is approximately thirty-degrees) (30°) for each of the nozzle bores 238.

Figure 17:
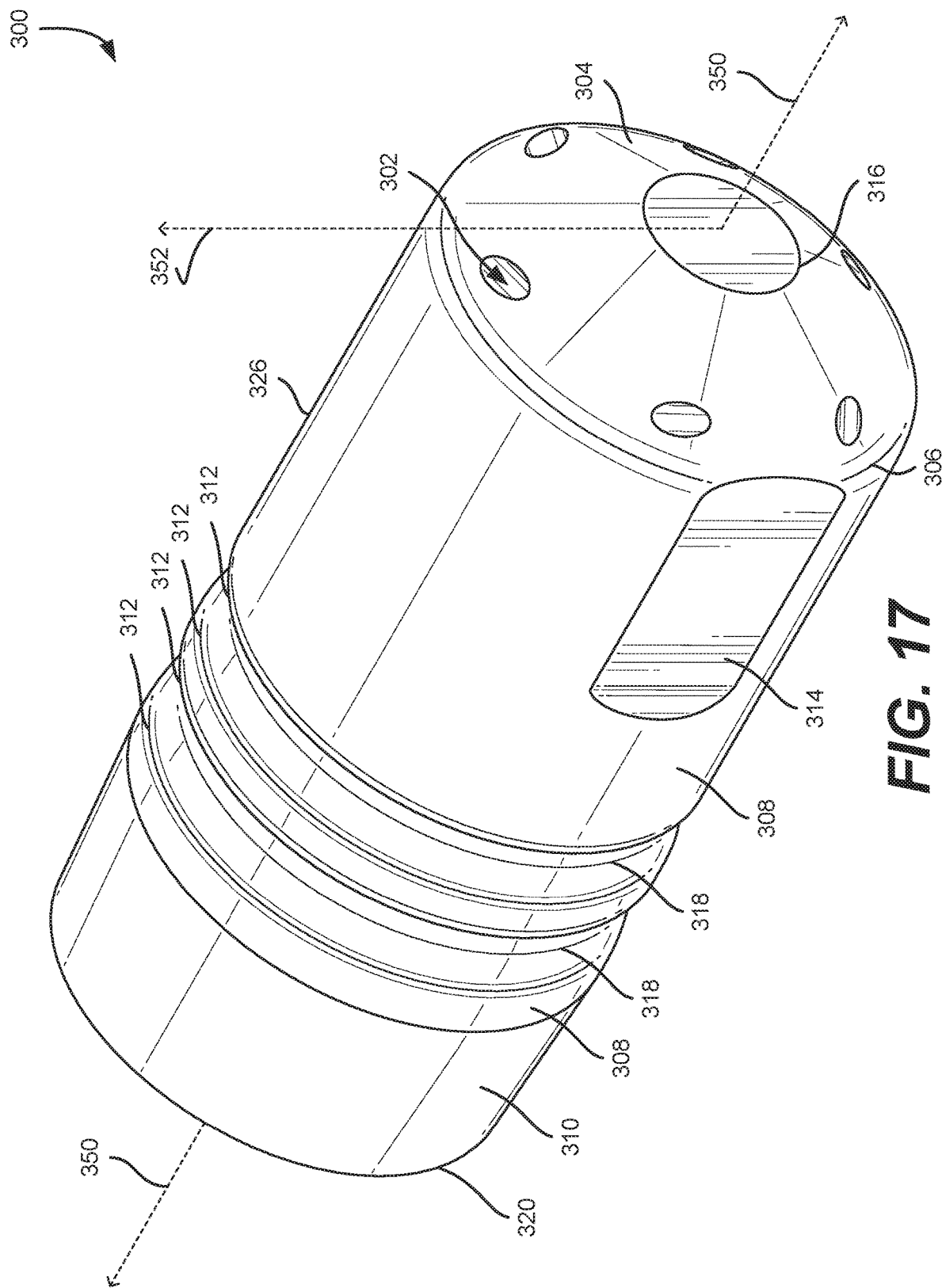
FIG. 17 is a front perspective view of a nozzle structure in accordance with an embodiment.

FIG. 17 is a front perspective view of a nozzle structure 300 in accordance with at least one embodiment and illustrating an alternative configuration of the nozzle structure 100 illustrated in FIG. 1 as described herein. In an embodiment, a nozzle surface 304 is similar to nozzle surface 104. In an embodiment, a plurality of outlets 302 are similar to plurality of outlets 102. In an embodiment, the plurality of outlets 302 comprises at least six outlets. In an embodiment, a nozzle intake end 306 is similar to nozzle intake end 106. In an embodiment, a nozzle outtake end 316 is similar to nozzle outtake end 116. In an embodiment, a lateral axis 352 is similar to the lateral axis 152.

In an embodiment, a nozzle body 326 is similar to nozzle body 126. In an embodiment, a source end 320 is similar to source end 120. In an embodiment, a longitudinal axis 350 is similar to longitudinal axis 150. In an embodiment, an exterior body surface 308 is similar to exterior body surface 108. In an embodiment, a transition region 310 is similar to transition region 110. In an embodiment, a plurality of ridges 314 are similar to plurality of ridges 114. In an embodiment, one or more exterior grooves 318 are similar to one or more exterior grooves 118. In an embodiment, the one or more exterior grooves 318 comprise at least two exterior grooves. In an embodiment, one or more groove edges 312 are similar to one or more groove edges 112. In an embodiment, the one or more groove edges 312 comprise at least four groove edges.

Figure 18:
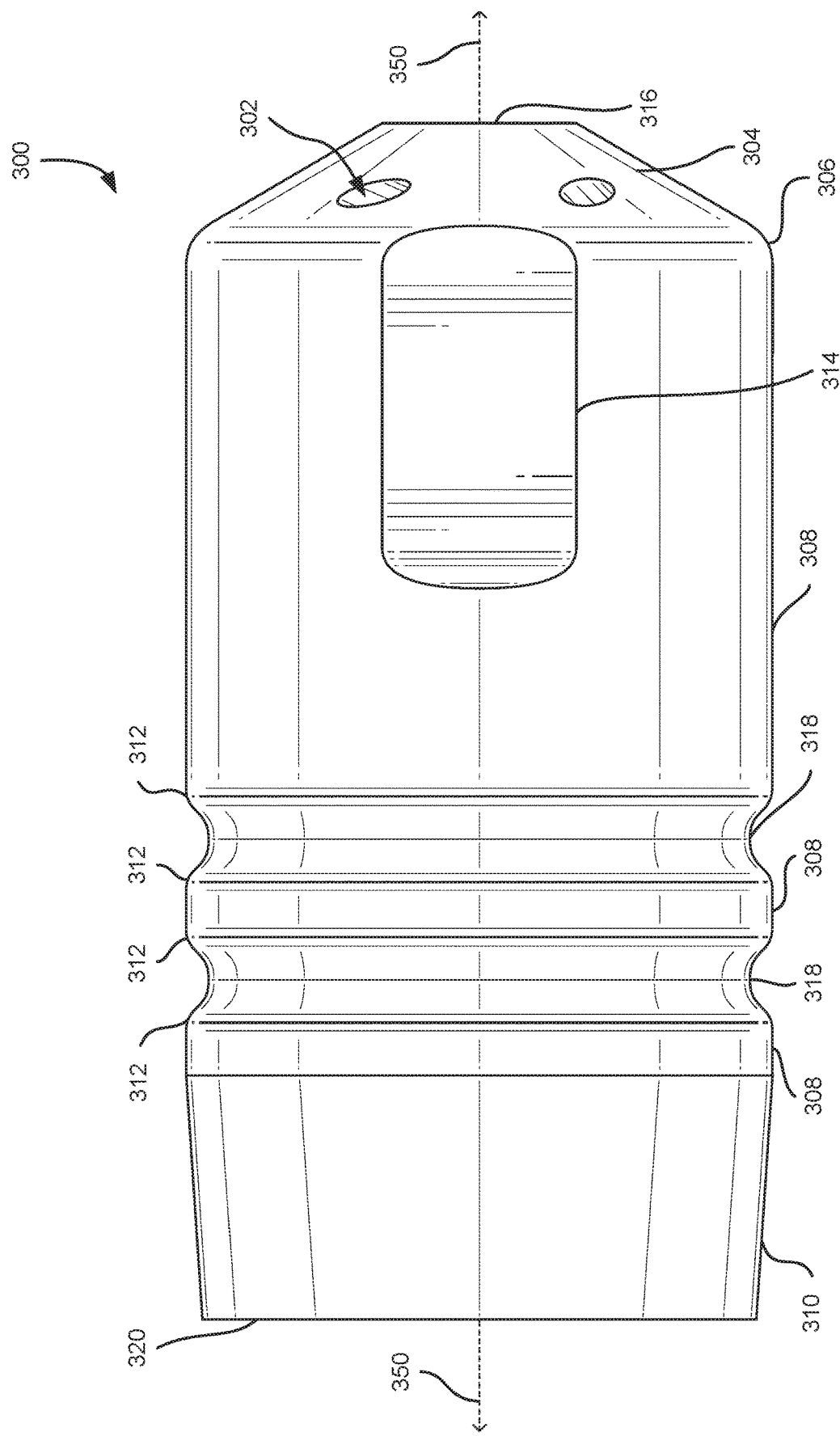
FIG. 18 is a front view of a nozzle structure in accordance with an embodiment.

FIG. 18 is a front view of an embodiment of the nozzle structure 300 in accordance with at least one embodiment and illustrating an alternative configuration of the nozzle structure 100 illustrated in FIG. 2 as described herein. A first external groove of one or more external grooves 318 as determined from the nozzle outtake end 316 may be positioned at approximately 16 mm-17 mm from the nozzle outtake end 316. The first external groove of one or more external grooves 318 as determined from the nozzle outtake end 316 may indicate that the nozzle structure 300 should be submerged at approximately 16 mm-17 mm into a volume a milk contained within a vessel, such as a pitcher. In an embodiment, the vessel may contain approximately 4 oz. of a target liquid. In an alternate embodiment, the vessel may contain approximately 30 oz. of a target liquid. As may be appreciated by one skilled in the art, the vessel may contain between approximately 4 oz. and 30 oz. of a target liquid. The center of a second external groove of one or more external grooves 318 as determined from the source end 320 may be positioned at approximately 7.19 mm from the source end 320. The center of a second external groove may be at a length of approximately 3.00 mm from the center of the first external groove.

Figure 19:
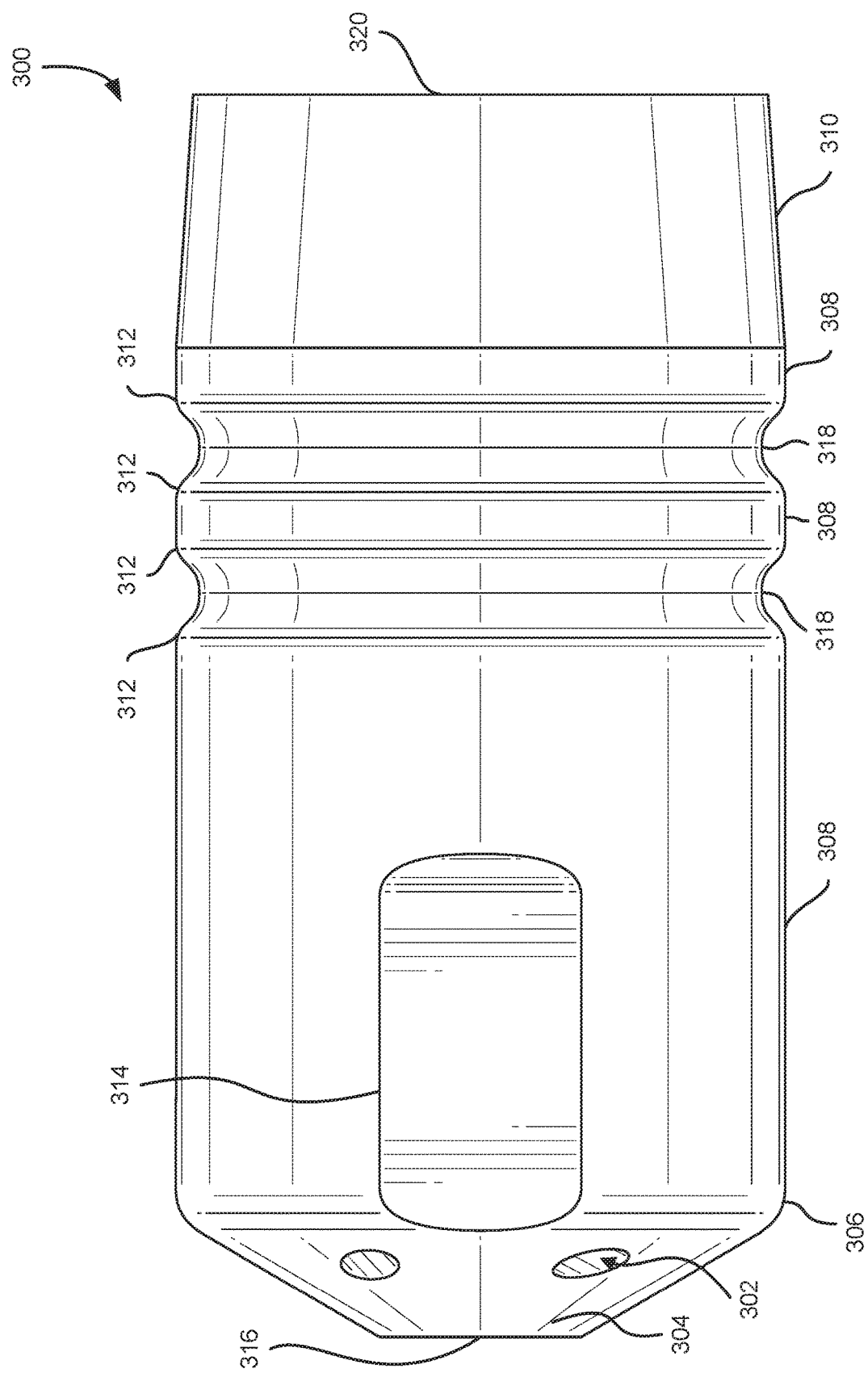
FIG. 19 is a rear view of a nozzle structure in accordance with an embodiment

FIG. 19 is a rear view of the nozzle structure 300 in accordance with at least one embodiment and illustrating an alternative configuration of the nozzle structure 100 illustrated in FIG. 3 as described herein.

Figure 20:
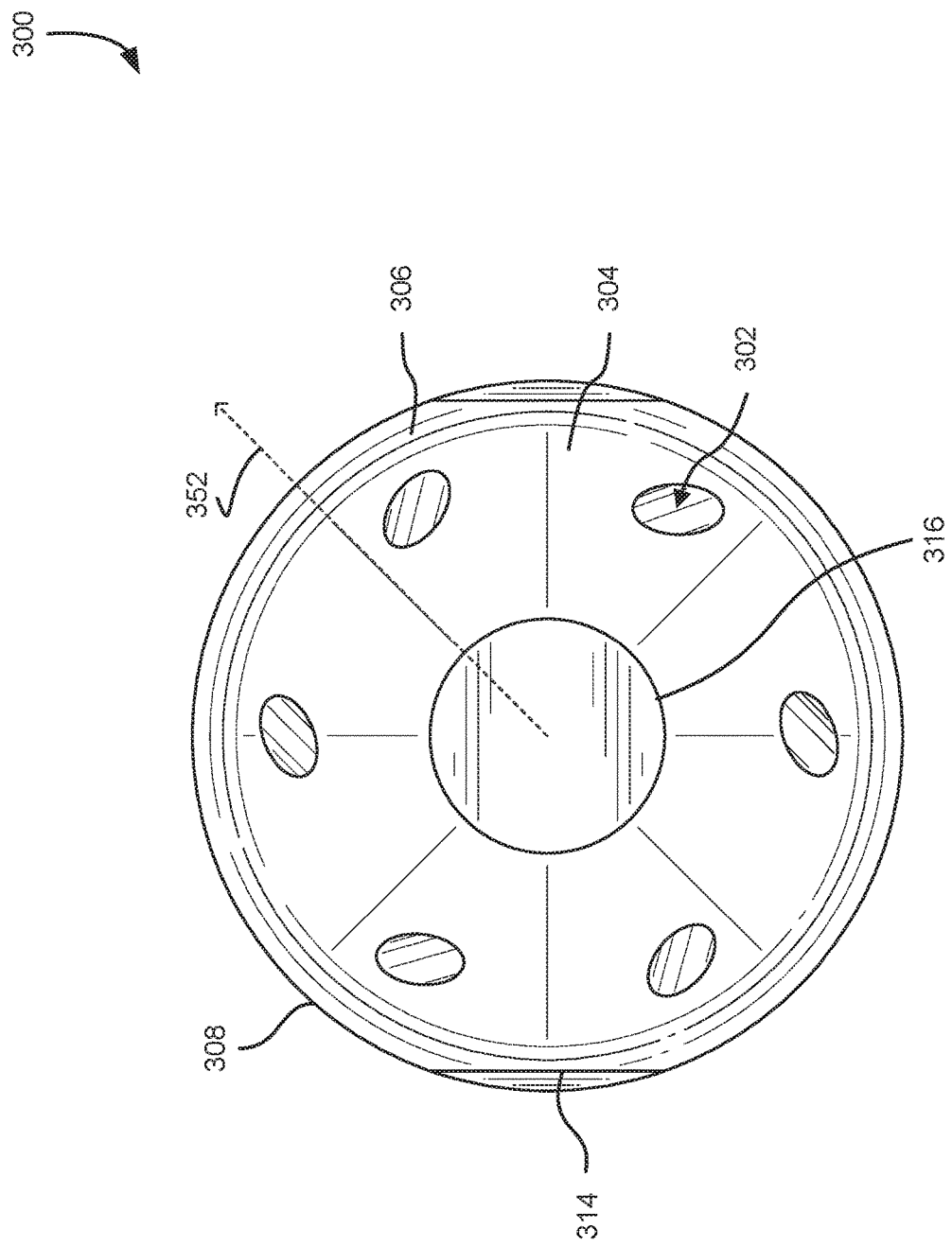
FIG. 20 is a top view of a nozzle structure in accordance with an embodiment.

FIG. 20 is a top view of the nozzle structure 300 in accordance with at least one embodiment and illustrating an alternative configuration of the nozzle structure 100 illustrated in FIG. 4 as described herein.

Figure 21:
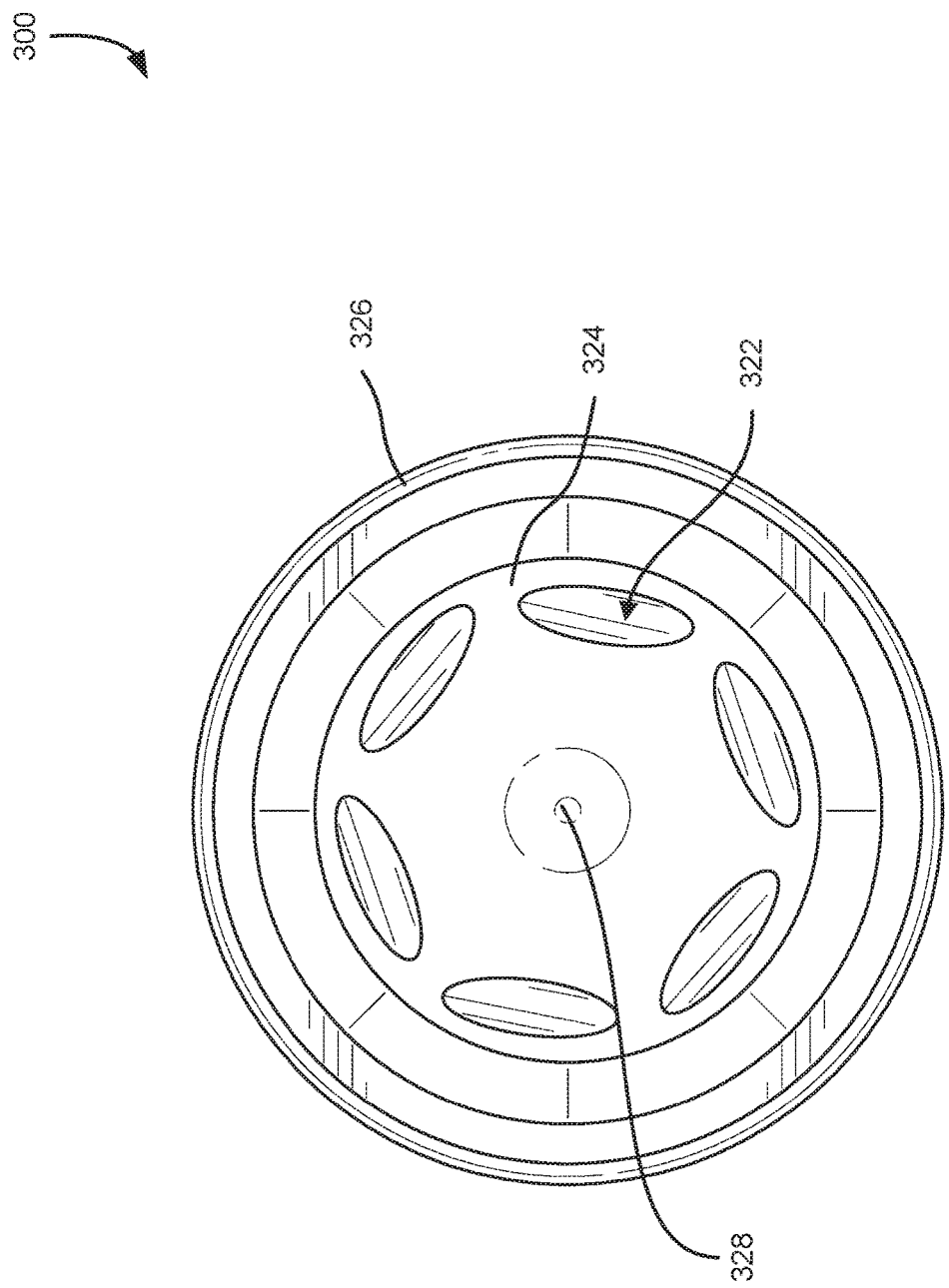
FIG. 21 is a bottom view including an interior view of a nozzle structure in accordance with an embodiment.

FIG. 21 is a bottom view including an interior view of the nozzle structure 300 in accordance with at least one embodiment and illustrating an alternative configuration of the nozzle structure 100 illustrated in FIG. 5 as described herein. In an embodiment, an interior nozzle surface 324 is similar to interior nozzle surface 124. In an embodiment, a center 328 is similar to the center 128. In an embodiment, a plurality of inlets 322 are similar to plurality of inlets 122. In an embodiment, the plurality of inlets 322 comprises at least six inlets.

Figure 22:
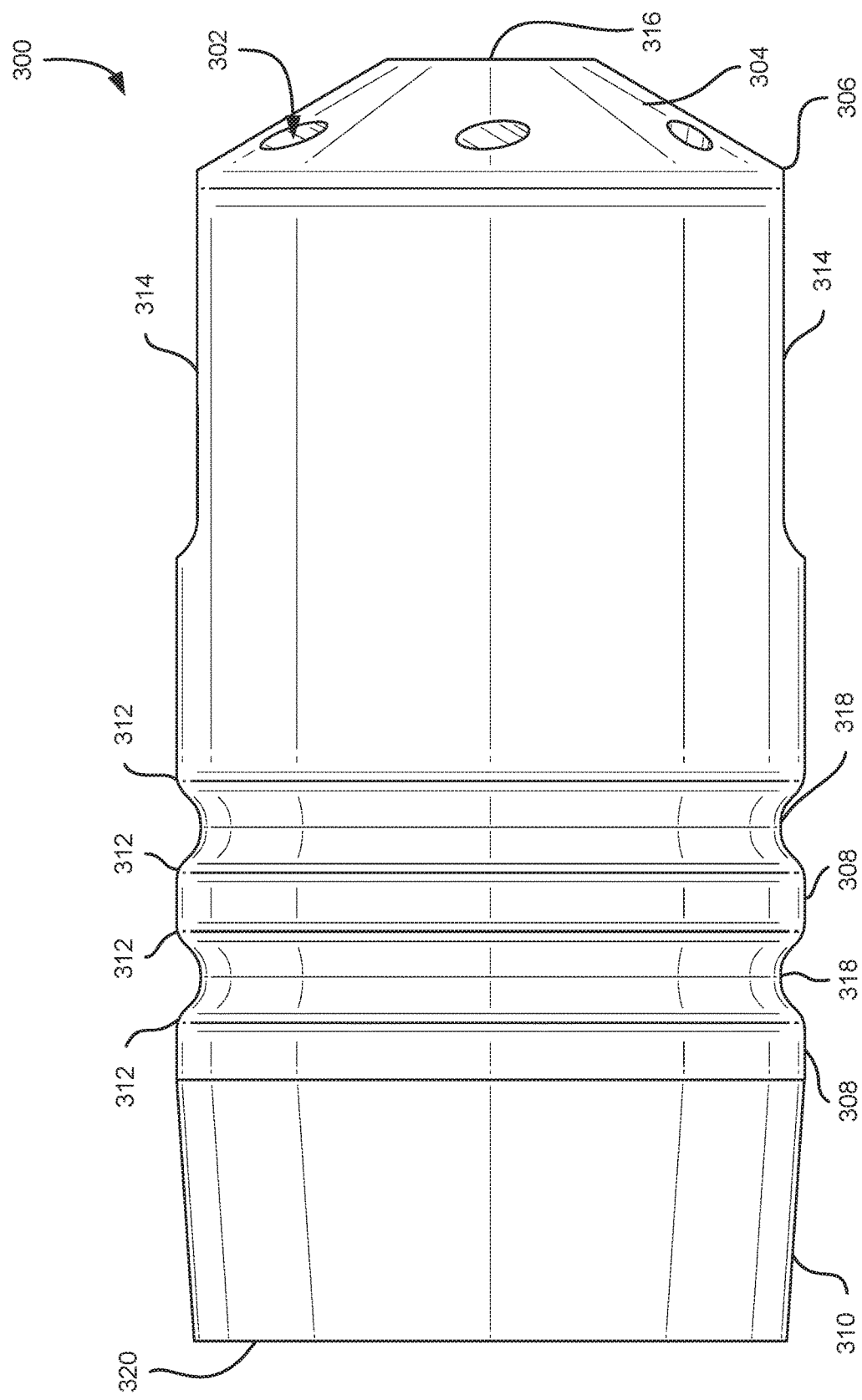
FIG. 22 is a right-side view of a nozzle structure in accordance with an embodiment.

FIG. 22 is a right-side view of the nozzle structure 300 in accordance with at least one embodiment and illustrating an alternative configuration of the nozzle structure 100 illustrated in FIG. 6 as described herein.

Figure 23:
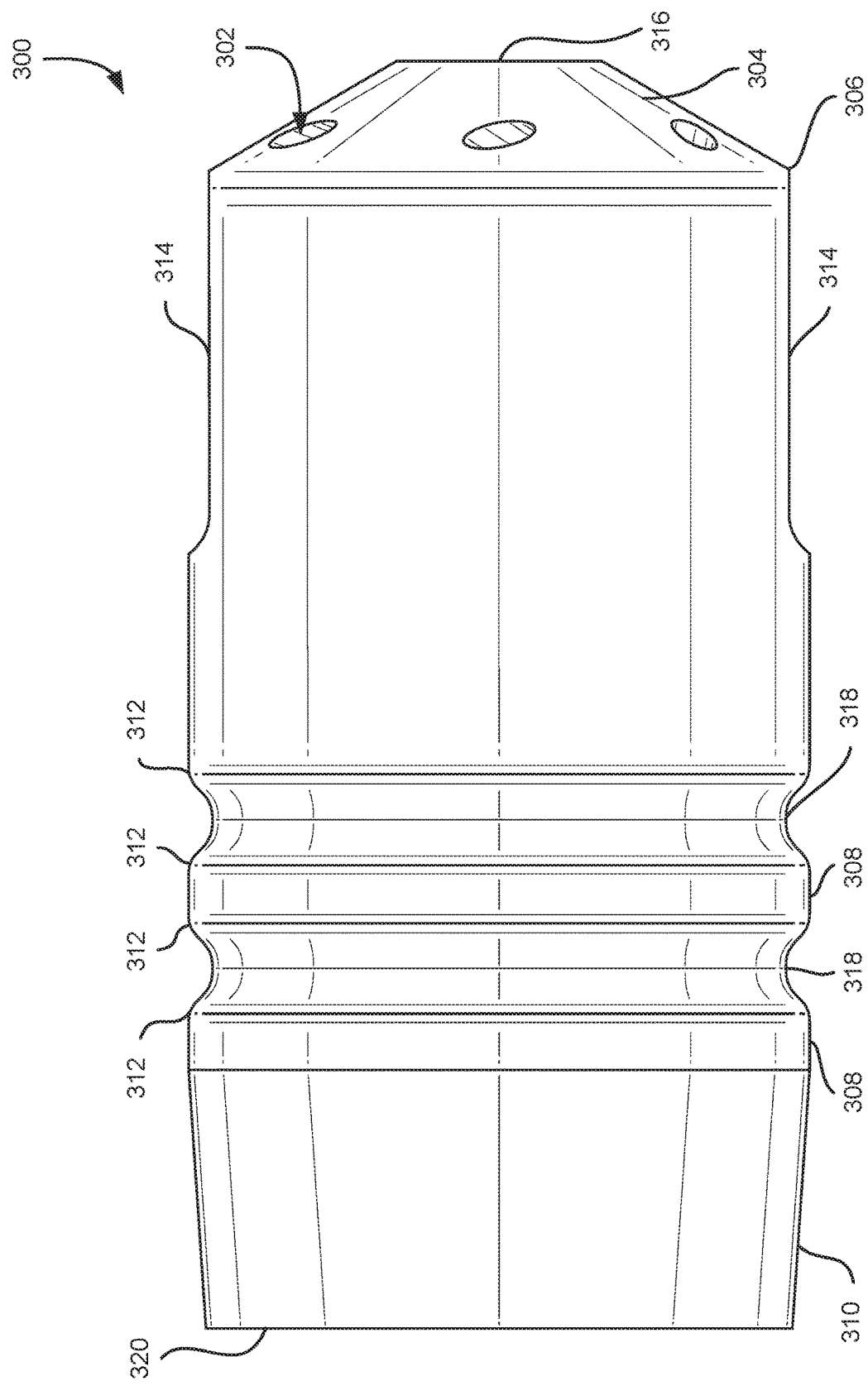
FIG. 23 is a left-side view of a nozzle structure in accordance with an embodiment.

FIG. 23 is a left-side view of the nozzle structure 300 in accordance with at least one embodiment and illustrating an alternative configuration of the nozzle structure 100 illustrated in FIG. 7 as described herein.

Figure 24:
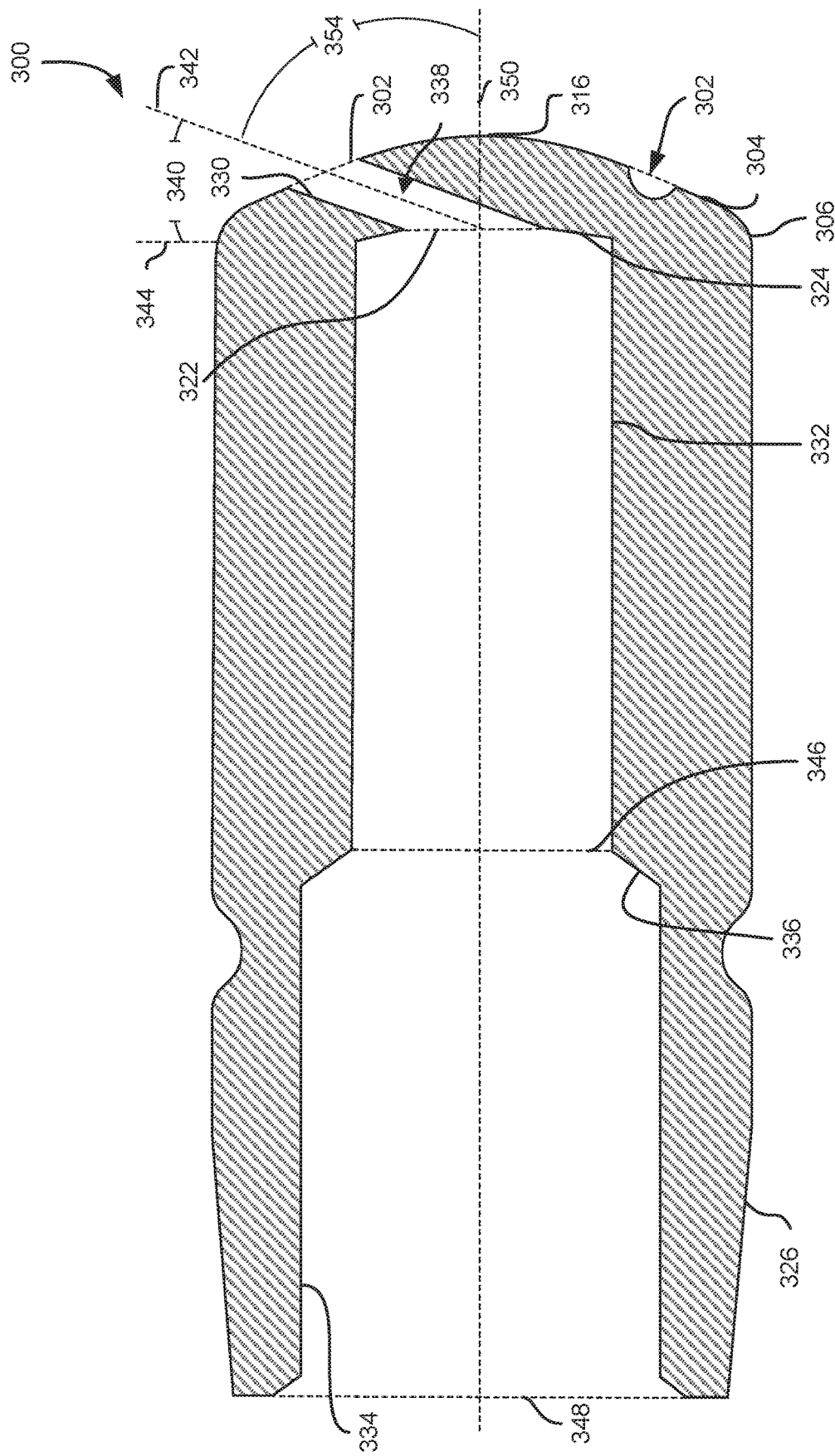
FIG. 24 is a front cross-sectional view of a nozzle structure in accordance with an embodiment.

FIG. 24 is a front cross-sectional view of the nozzle structure 300 in accordance with at least one embodiment and illustrating an alternative configuration of the nozzle structure 100 illustrated in FIG. 8 as described herein. In an embodiment, a plurality of nozzle bores 338 are similar to plurality of nozzle bores 138. In an embodiment, the plurality of nozzle bores 338 comprises at least six nozzle bores. In an embodiment, a bore axis 342 is similar to bore axis 142. In an embodiment, a plane 344 is similar to plane 144. In an embodiment, an interior nozzle body surface 332 is similar to interior nozzle body surface 132. In an embodiment, a source end opening 348 is similar to the source end opening 148. In an embodiment, an adapter surface 334 is similar to adapter surface 134. In an embodiment, an interior ridge 336 is similar to interior ridge 136. In an embodiment, an acute angle 340 is similar to acute angle 140. In an embodiment, an angle 354 is similar to angle 154. In an embodiment, the acute angle 340 is approximately twenty-degrees) (20°) for each of the nozzle bores 338.

Figure 25:
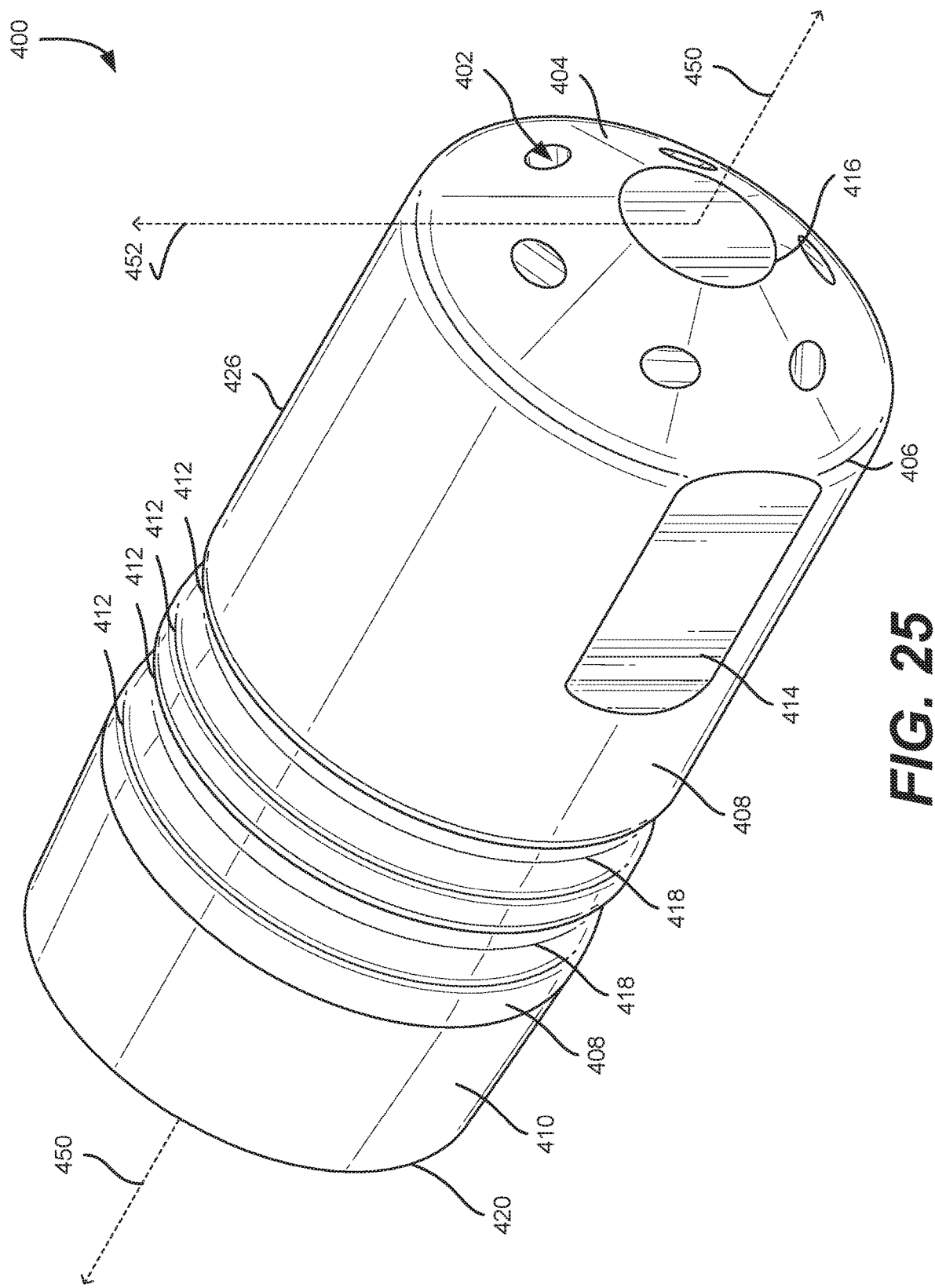
FIG. 25 is a front perspective view of a nozzle structure in accordance with an embodiment.

FIG. 25 is a front perspective view of a nozzle structure 400 in accordance with at least one embodiment and illustrating an alternative configuration of the nozzle structure 100 illustrated in FIG. 1 as described herein. In an embodiment, a nozzle surface 404 is similar to nozzle surface 104. In an embodiment, a plurality of outlets 402 are similar to plurality of outlets 102. In an embodiment, the plurality of outlets 402 comprises at least six outlets. In an embodiment, a nozzle intake end 406 is similar to nozzle intake end 106. In an embodiment, a nozzle outtake end 416 is similar to nozzle outtake end 116. In an embodiment, a lateral axis 452 is similar to the lateral axis 152.

In an embodiment, a nozzle body 426 is similar to nozzle body 126. In an embodiment, a source end 420 is similar to source end 120. In an embodiment, a longitudinal axis 450 is similar to longitudinal axis 150. In an embodiment, an exterior body surface 408 is similar to exterior body surface 108. In an embodiment, a transition region 410 is similar to transition region 110. In an embodiment, a plurality of ridges 414 are similar to plurality of ridges 114. In an embodiment, one or more exterior grooves 418 are similar to one or more exterior grooves 118. In an embodiment, the one or more exterior grooves 418 comprise at least two exterior grooves. In an embodiment, one or more groove edges 412 are similar to one or more groove edges 112. In an embodiment, the one or more groove edges 412 comprise at least four groove edges.

Figure 26:
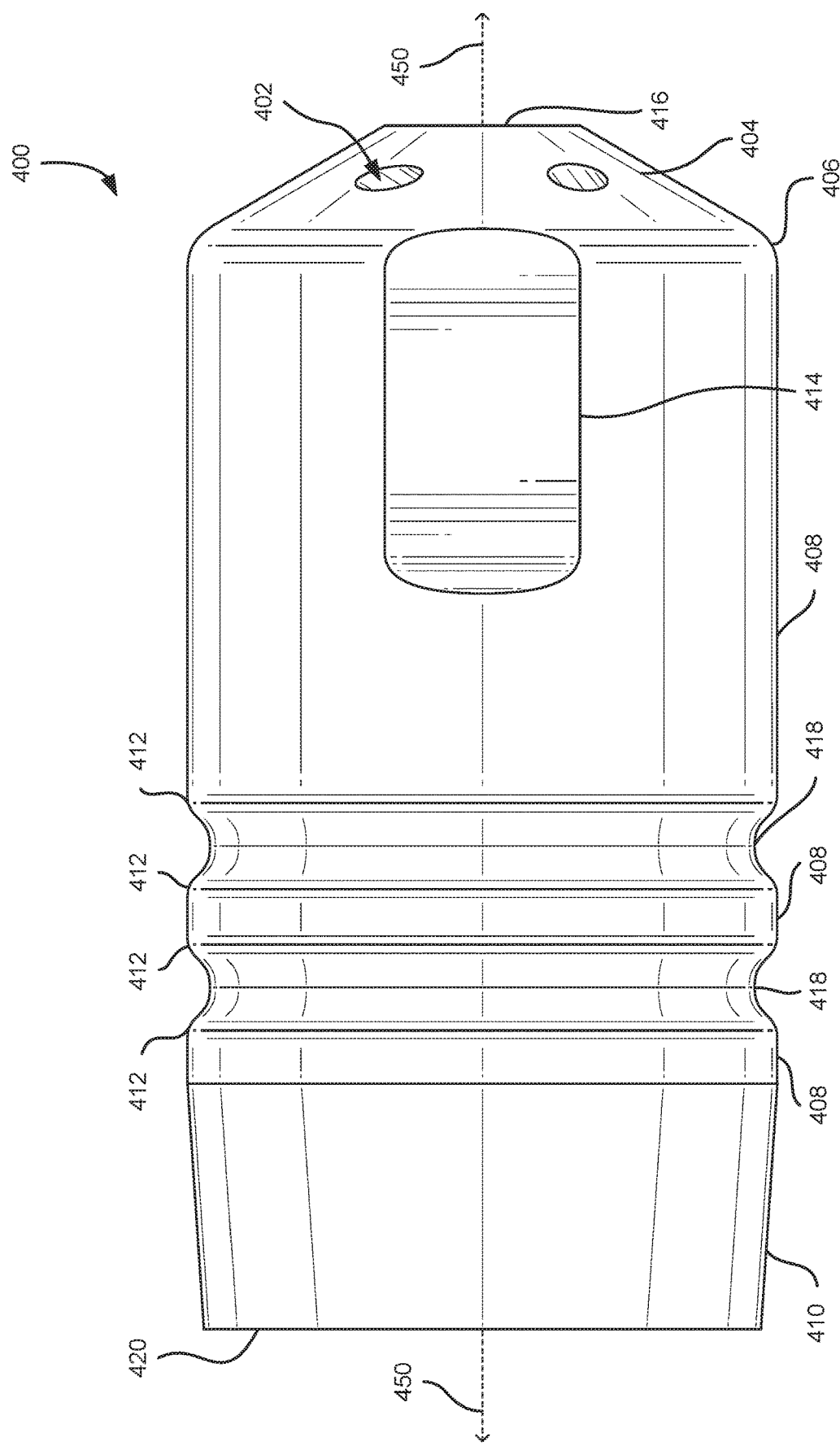

FIG. 26 is a front view of the nozzle structure 400 in accordance with at least one embodiment and illustrating an alternative configuration of the nozzle structure 100 illustrated in FIG. 2 as described herein.

FIG. 27 is a rear view of the nozzle structure 400 in accordance with at least one embodiment and illustrating an alternative configuration of the nozzle structure 100 illustrated in FIG. 3 as described herein.

FIG. 28 is a top view of the nozzle structure 400 in accordance with at least one embodiment and illustrating an alternative configuration of the nozzle structure 100 illustrated in FIG. 4 as described herein.

FIG. 29 is a bottom view including an interior view of the nozzle structure 400 in accordance with at least one embodiment and illustrating an alternative configuration of the nozzle structure 100 illustrated in FIG. 5 as described herein. In an embodiment, an interior nozzle surface 424 is similar to interior nozzle surface 124. In an embodiment, a center 428 is similar to the center 128. In an embodiment, a plurality of inlets 422 are similar to plurality of inlets 122. In an embodiment, the plurality of inlets 422 comprises at least six inlets.

FIG. 30 is a right-side view of the nozzle structure 400 in accordance with at least one embodiment and illustrating an alternative configuration of the nozzle structure 100 illustrated in FIG. 6 as described herein.

FIG. 31 is a left-side view of the nozzle structure 400 in accordance with at least one embodiment and illustrating an alternative configuration of the nozzle structure 100 illustrated in FIG. 7 as described herein.

FIG. 32 is a front cross-sectional view of the nozzle structure 400 in accordance with at least one embodiment and illustrating an alternative configuration of the nozzle structure 100 illustrated in FIG. 8 as described herein. In an embodiment, a plurality of nozzle bores 438 are similar to plurality of nozzle bores 138. In an embodiment, the plurality of nozzle bores 438 comprises at least six nozzle bores. In an embodiment, a bore axis 442 is similar to bore axis 142. In an embodiment, a plane 444 is similar to plane 144. In an embodiment, an interior nozzle body surface 432 is similar to interior nozzle body surface 132. In an embodiment, a source end opening 448 is similar to the source end opening 148. In an embodiment, an adapter surface 434 is similar to adapter surface 134. In an embodiment, an interior ridge 436 is similar to interior ridge 136. In an embodiment, an acute angle 440 is similar to acute angle 140. In an embodiment, an angle 454 is similar to angle 154. In an embodiment, the acute angle 440 is approximately thirty-degrees (30°) for each of the nozzle bores 438.

FIG. 33A is a front cross-sectional view of a vessel for use with a nozzle structure in accordance with an embodiment. The nozzle structure 502, extending from a source fluid source 504, is inserted in the vessel 514 containing a target fluid 512 and ambient air 516. As source fluid flows through the nozzle structure 502, an approximately downward angle of the flow path 506 of the source fluid may induce rolling 508 of the source fluid and target fluid 512 within the vessel 514 such that the source fluid and target fluid 512 are vertically mixed. Due to the depth at which the nozzle structure 502 is inserted in the target fluid 512, ambient air 516 may be mixed with the target fluid 512. FIG. 33B is a top view of a vessel for use with a nozzle structure in accordance with an embodiment. As the source fluid flows through the nozzle structure 502 along flow path 506, nozzle bores distributed along the nozzle structure 502 may induce whirlpooling 510, causing the source fluid and target fluid 512 to horizontally mix within the vessel 514. In an embodiment, rolling 508 from the nozzle structure 502 is combined with whirlpooling 510 such that a source fluid simultaneously causes horizontal and vertical mixing with a target fluid 512 in the vessel 514. In an embodiment, the source fluid is steam and the target fluid 512 is milk.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

In addition, unless otherwise noted or contradicted by context, the term "plurality" indicates a state of being plural (e.g., "a plurality of items" indicates multiple items). The number of items in a plurality is at least two but can be more when so indicated either explicitly or by context.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A nozzle structure, comprising:
    a nozzle body comprising an intake end configured to engage with a source of steam and an outtake end, the outtake end forming a plurality of paired-evenly numbered nozzle bores comprising at least four bores where each bore of the at least four bores allows steam to pass from an interior space defined by the nozzle body to a space outside of the nozzle body, the nozzle body defining at least one groove extending around an exterior surface of the nozzle body to mark a depth at which the nozzle body is to be inserted into a vessel of milk to froth the milk, wherein:
    the bores of the at least four bores being formed such that:
        each bore of the at least four bores is oriented to cause steam to exit the nozzle structure at an angle acute to a longitudinal axis extending from the intake end through the outtake end, the acute angle being between each bore and the longitudinal axis;
        each bore of the at least four bores is uniformly distributed about an exterior frustrum surface of the outtake end of the nozzle body o cause steam to exit the nozzle structure in a direction different from one or more remaining bores of the at least four bores; and
        the direction, respective to a lateral plane, of each bore is parallel and opposing to a corresponding direction of one other bore of the plurality of evenly numbered nozzle bores;
    the interior space is comprised of a first portion and a second portion, the first portion adjacent to the intake end being of a width greater than the second portion adjacent to the outtake end, the first and second portions being separated by an interior ridge comprising a gasket; and
    a plurality of flat exterior ridges on the exterior surface of the nozzle body intersect with and reduce the diameter of the exterior frustrum surface, the flat exterior ridges to engage a gripping tool for attaching or removing the nozzle body.

2. The nozzle structure of claim 1, wherein the plurality of nozzle bores are-uniformly distributed about the exterior frustrum surface of the outtake end such that the direction of each bore is substantially tangent to the exterior frustrum surface.

3. The nozzle structure of claim 1, wherein the acute angle is between 60° and 70°.

4. The nozzle structure of claim 1, wherein the second portion of the interior space approximates a frustum of a cone.

5. The nozzle structure of claim 1, wherein the intake end is configured to attach to a steam tube by friction.

6. A nozzle body, comprising:
an intake end configured to engage with a source of a source fluid and an outtake end, the outtake end forming a plurality of nozzle bores being evenly numbered where each bore of the plurality of nozzle bores allows the source fluid to pass from an interior space defined by the nozzle body to a space outside of the nozzle body, the bores of the plurality of nozzle bores being formed such that each bore of the plurality of the nozzle bores is oriented to cause:
the source fluid to enter the each bore along an arcuate interior nozzle surface opposite the intake end;
the source fluid to exit the nozzle body at a nonzero angle relative to an axis extending from the intake end through the outtake end; and
the source fluid to exit the nozzle structure in a direction different from one or more remaining bores of the plurality of nozzle bores;
wherein the direction, respective to a lateral plane, of each bore is parallel and opposing to a corresponding direction of one other bore of the plurality of nozzle bores.

7. The nozzle body of claim 6, wherein the outtake end is approximately conical.

8. The nozzle body of claim 6, wherein the nonzero angle is an acute angle.

9. The nozzle body of claim 6, wherein the intake end is configured to removably attach to the source, wherein the interior space is comprised of a first portion and a second portion, the first portion adjacent to the intake end being of a width greater than the second portion adjacent to the outtake end, the first and second portions being separated by an interior ridge comprising a gasket.

10. The nozzle body of claim 6, wherein each of the plurality of nozzle bores are uniformly distributed about the outtake end.

11. The nozzle body of claim 6, wherein the nozzle body further comprises one or more grooves around the nozzle body indicating a depth to submerge the nozzle body into a target fluid.

12. The nozzle body of claim 6, wherein the nozzle body further comprises one or more exterior ridges uniformly distributed about a periphery on the exterior surface of the with the nozzle body, the one or more exterior ridges intersecting with and reducing the diameter of an exterior frustrum surface associated with the outtake end.

13. An espresso machine, comprising: a first component configured to make espresso;
a second component configured to provide steam for frothing milk, the second component comprising:
a source of steam; and
a nozzle body comprising:
an intake end configured to engage with a source of steam and an outtake end, the outtake end forming a plurality of nozzle bores being evenly numbered where each bore of the plurality of bores allows steam to pass from an interior space defined by the nozzle body to a space outside of the nozzle body, the bores of the plurality of bores being formed such that each bore of the plurality of paired-bores is oriented:
entirely within a frustrum nozzle surface;
to cause steam to exit the nozzle body at a nonzero angle relative to an axis extending from the intake end through the outtake end; and
to cause steam to exit the nozzle body in a direction different from the remaining bores of the plurality of bores; wherein the direction, respective to a lateral plane, of each bore is parallel and opposing to a corresponding direction of one other bore of the plurality of nozzle bores.

14. The espresso machine of claim 13, wherein each bore of the plurality of bores is uniformly distributed about the outtake end.

15. The espresso machine of claim 13, wherein the interior space approximates a frustum of a cone.

16. The espresso machine of claim 13, wherein the plurality of nozzle bores being evenly numbered comprises at 1 east six bores.

17. The espresso machine of claim 13, wherein the nonzero angle is approximately between 60° and 70°.

18. The espresso machine of claim 13, wherein the nozzle body is configured to removably attach to the source of steam.

19. The espresso machine of claim 13, wherein the intake end further comprises an internally threaded end for connection to a steam tube.

* * * * *